United States Patent
Kawakami et al.

(10) Patent No.: US 10,608,248 B2
(45) Date of Patent: Mar. 31, 2020

(54) LITHIUM MANGANESE COMPOSITE OXIDE, SECONDARY BATTERY, AND ELECTRICAL DEVICE

(71) Applicant: SEMICONDUCTOR ENERGY LABORATORY CO., LTD., Atsugi-shi, Kanagawa-ken (JP)

(72) Inventors: Takahiro Kawakami, Kanagawa (JP); Tatsuya Ikenuma, Kanagawa (JP); Satoshi Seo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 109 days.

(21) Appl. No.: 15/856,281

(22) Filed: Dec. 28, 2017

(65) Prior Publication Data

US 2018/0123125 A1 May 3, 2018

Related U.S. Application Data

(63) Continuation of application No. 14/492,759, filed on Sep. 22, 2014, now Pat. No. 9,865,867.

(30) Foreign Application Priority Data

Oct. 4, 2013 (JP) ................... 2013-209444
Dec. 27, 2013 (JP) ................... 2013-270950

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/364* (2013.01); *H01M 4/505* (2013.01);
(Continued)

(58) Field of Classification Search
CPC ........ H01M 4/36; H01M 4/364; H01M 4/366; H01M 4/02; H01M 4/505; H01M 4/131; H01M 10/0525
See application file for complete search history.

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

EP 2741353 A 6/2014
EP 2811557 A 12/2014
(Continued)

OTHER PUBLICATIONS

Thackery.M et al., "Li2MnO3-stabilized LiMO2(M = Mn, Ni, Co) electrodes for lithium-ion batteries", J. Mater. Chem. (Journal of Materials Chemistry), 2007, vol. 17, pp. 3112-3125.
(Continued)

*Primary Examiner* — Karie O'Neill Apicella
(74) *Attorney, Agent, or Firm* — Nixon Peabody LLP; Jeffrey L. Costella

(57) ABSTRACT

The volume density or weight density of lithium ions that can be received and released in and from a positive electrode active material is increased to achieve high capacity and high energy density of a secondary battery. In a lithium manganese composite oxide, each particle includes a first region including a crystal with a layered rock-salt crystal structure and a second region including a crystal with a spinel crystal structure. The second region is in contact with the outside of the first region. The lithium manganese composite oxide has high structural stability and high capacity.

12 Claims, 34 Drawing Sheets

(51) Int. Cl.
*H01M 4/505* (2010.01)
*H01M 4/02* (2006.01)
*H01M 10/0525* (2010.01)

(52) U.S. Cl.
CPC .. *H01M 10/0525* (2013.01); *H01M 2004/021* (2013.01); *H01M 2004/028* (2013.01); *H01M 2220/30* (2013.01)

(56) References Cited

U.S. PATENT DOCUMENTS

| | | | |
|---|---|---|---|
| 5,240,794 | A | 8/1993 | Thackeray et al. |
| 5,443,929 | A | 8/1995 | Yamamoto et al. |
| 5,783,333 | A | 7/1998 | Mayer |
| 5,834,139 | A | 11/1998 | Shodai et al. |
| 5,871,866 | A | 2/1999 | Barker et al. |
| 5,910,382 | A | 6/1999 | Goodenough et al. |
| 6,085,015 | A | 7/2000 | Armand et al. |
| 6,458,487 | B1 * | 10/2002 | Takeuchi ............ H01M 4/131 429/218.1 |
| 6,514,640 | B1 | 2/2003 | Armand et al. |
| 7,303,840 | B2 | 12/2007 | Thackeray et al. |
| 7,393,476 | B2 | 7/2008 | Shiozaki et al. |
| 7,635,536 | B2 | 12/2009 | Johnson et al. |
| 7,736,807 | B2 | 6/2010 | Hasegawa et al. |
| 7,790,308 | B2 | 9/2010 | Johnson et al. |
| 8,080,340 | B2 | 12/2011 | Thackeray et al. |
| 8,557,440 | B2 | 10/2013 | Yu et al. |
| 9,331,335 | B2 | 5/2016 | Kaburagi et al. |
| 9,368,791 | B2 | 6/2016 | Kim et al. |
| 2001/0010807 | A1 | 8/2001 | Matsubara |
| 2002/0195591 | A1 | 12/2002 | Ravet et al. |
| 2004/0234857 | A1 | 11/2004 | Shiozaki et al. |
| 2006/0051671 | A1 | 3/2006 | Thackeray et al. |
| 2006/0051673 | A1 | 3/2006 | Johnson et al. |
| 2006/0121352 | A1 | 6/2006 | Kejha et al. |
| 2007/0026315 | A1 | 2/2007 | Lampe-Onnerud et al. |
| 2007/0160906 | A1 | 7/2007 | Tooyama et al. |
| 2007/0212609 | A1 | 9/2007 | Iwami |
| 2009/0087731 | A1 | 4/2009 | Fukui et al. |
| 2009/0123813 | A1 | 5/2009 | Chiang et al. |
| 2009/0123842 | A1 | 5/2009 | Thackeray et al. |
| 2009/0220862 | A1 | 9/2009 | Toyama et al. |
| 2010/0143784 | A1 | 6/2010 | Johnson et al. |
| 2010/0233542 | A1 | 9/2010 | Endo et al. |
| 2010/0248033 | A1 | 9/2010 | Kumar et al. |
| 2011/0200879 | A1 | 8/2011 | Saito et al. |
| 2011/0229757 | A1 | 9/2011 | Kawakami et al. |
| 2014/0332715 | A1 | 11/2014 | Kawakami et al. |

FOREIGN PATENT DOCUMENTS

| | | |
|---|---|---|
| JP | 08-037007 A | 2/1996 |
| JP | 11-025983 A | 1/1999 |
| JP | 2005-332629 A | 12/2005 |
| JP | 2006-012426 A | 1/2006 |
| JP | 2007-213866 A | 8/2007 |
| JP | 2008-166156 A | 7/2008 |
| JP | 2011-096626 A | 5/2011 |
| JP | 2011-134708 A | 7/2011 |
| JP | 2012-084257 A | 4/2012 |
| JP | 2012-146443 A | 8/2012 |
| JP | 2013-161621 A | 8/2013 |
| JP | 2014-116308 A | 6/2014 |
| WO | WO-2011/065464 | 6/2011 |

OTHER PUBLICATIONS

Berbenni.V et al., "Thermogravimetry and X-ray Diffraction Study of the Thermal Decomposition Processes in Li2CO3-MNCO3 Mixtures", Journal of Analytical and Applied Pyrolysis, 2002, vol. 62, pp. 45-62.

Johnson.C et al., "Lithium-manganese oxide electrodes with layered-spinel composite structures xLi2MnO3—(1-x)Li1+yMn2-yO4(0<x<1,0≤y≤0.33) for lithium batteries", Electrochemistry Communications, May 1, 2005, vol. 7, No. 5, pp. 528-536, Elsevier.

* cited by examiner

FIG. 7A1
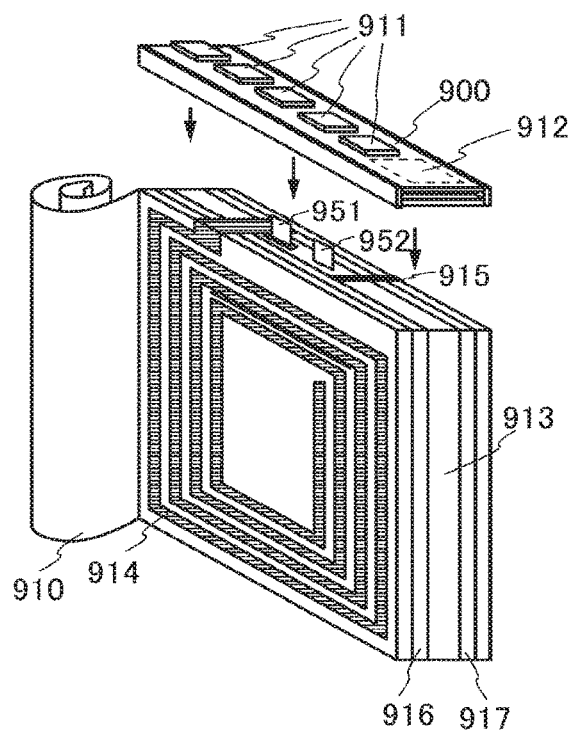
FIG. 7A2
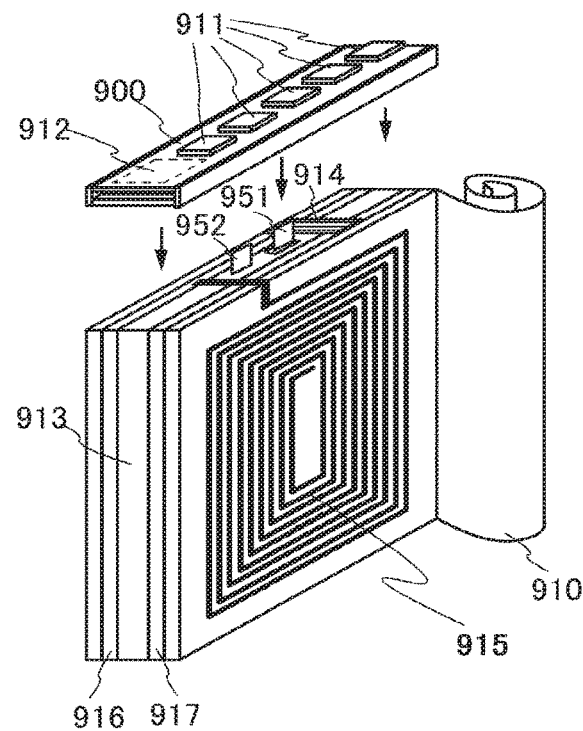
FIG. 7B1
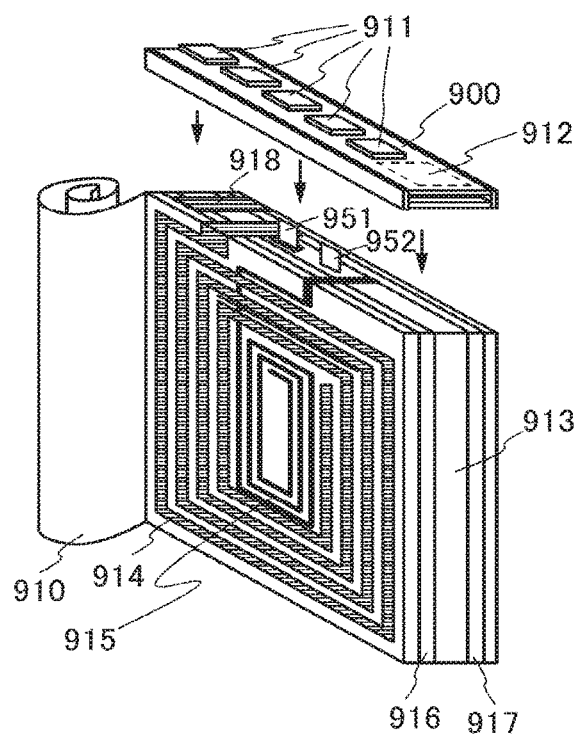
FIG. 7B2
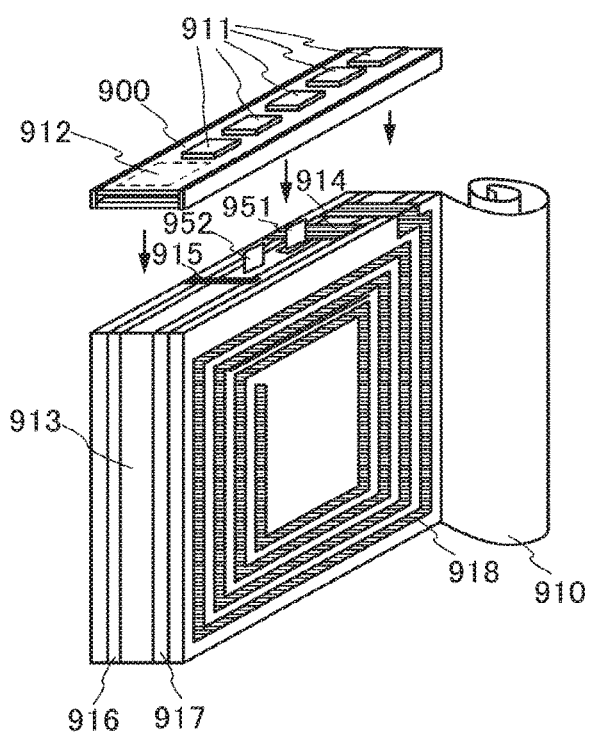

FIG. 21
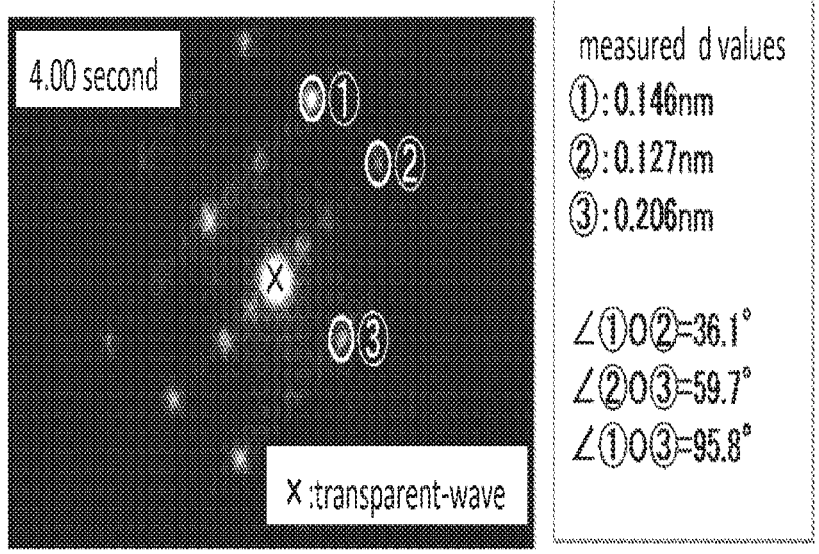
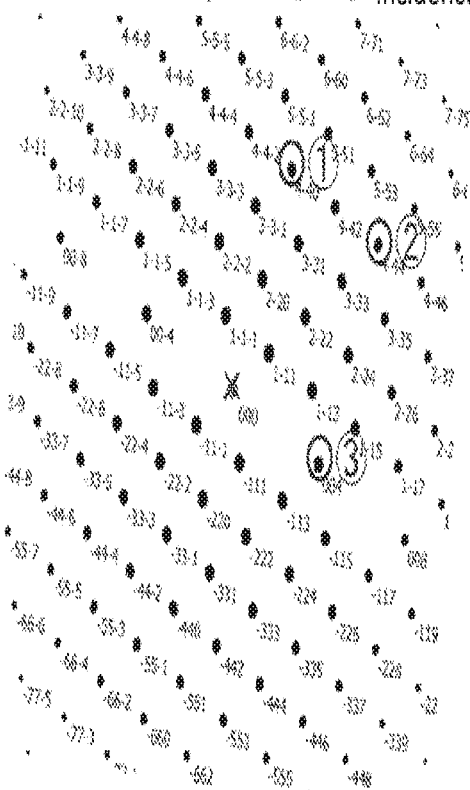

| [measured values] | [84-1634] | [27-1252] |
|---|---|---|
| OA: d=0.455nm | (001): d=0.474nm | (10$\bar{1}$): d=0.464nm |
| OB: d=0.227nm | ($\bar{1}$31): d=0.233nm | (1$\bar{3}$1): d=0.233nm |
| OC: d=0.240nm | ($\bar{1}$30): d=0.242nm | (0$\bar{3}$2): d=0.243nm |
| ∠AOB=70.7° | ∠AOB=71.0° | ∠AOB=70.2° |
| ∠AOC=100.2° | ∠AOC=100.0° | ∠AOC=99.8° |
| ∠BOC=29.4° | ∠BOC=29.0° | ∠BOC=29.5° |
| | [310] incidence | [323] incidence |

LITHIUM MANGANESE COMPOSITE OXIDE, SECONDARY BATTERY, AND ELECTRICAL DEVICE

BACKGROUND OF THE INVENTION

1. Field of the Invention

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, or a manufacturing method thereof. In particular, one embodiment of the present invention relates to a structure of a secondary battery and a method for manufacturing the secondary battery. In particular, one embodiment of the present invention relates to a positive electrode active material of a lithium-ion secondary battery.

2. Description of the Related Art

Examples of the secondary battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively developed because the capacity thereof can be increased and the size thereof can be reduced.

As examples of positive electrode active materials of a lithium-ion secondary battery, phosphate compounds each having an olivine structure and containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), which are disclosed in Patent Document 1, are known.

REFERENCE

[Patent Document 1] Japanese Published Patent Application No. H11-25983

SUMMARY OF THE INVENTION

An object is to increase the volume density or weight density of lithium ions that can be received and released in and from a positive electrode active material to achieve high capacity and high energy density of a secondary battery.

Another object is to provide a positive electrode active material that can be manufactured at low cost.

Furthermore, high ion conductivity and high electron conductivity are required as the properties of a positive electrode active material of a lithium-ion secondary battery. Thus, another object is to provide a positive electrode active material having high ion conductivity and high electron conductivity.

Another object is to provide a novel material. Another object is to provide a novel positive electrode active material. Another object is to provide a novel battery. Another object is to provide a novel lithium-ion secondary battery.

Note that the descriptions of these objects do not disturb the existence of other objects. In one embodiment of the present invention, there is no need to achieve all the objects. Other objects will be apparent from and can be derived from the description of the specification, the drawings, the claims, and the like.

The inventors have found that a novel material can be formed by combining lithium manganese composite oxides, $LiMn_{2-x}M_xO_4$ with a spinel crystal structure and $Li_2Mn_{1-y}M_yO_3$ with a layered rock-salt ($\alpha$-$NaFeO_2$ type) crystal structure. Here, $0 \leq x \leq 2$ and $0 \leq y \leq 1$ are satisfied, and the element M is silicon, phosphorus, or a metal element other than lithium and manganese.

The novel material is a lithium manganese composite oxide in which each particle has a layered rock-salt crystal structure inside and has a spinel crystal structure on the outside thereof. Here, the lithium manganese composite oxide is an oxide containing at least lithium and manganese. The lithium manganese composite oxide may contain another metal, or an element such as silicon or phosphorus. In the case where the lithium manganese composite oxide is used as a positive electrode active material of a lithium-ion secondary battery, lithium may be released from the lithium manganese composite oxide by charging. In the case of using this novel material as a positive electrode active material of a lithium-ion secondary battery, lithium inside the particle is released or diffused through a region with a spinel crystal structure of the surface of each particle, resulting in high capacity.

The above novel material has a region with a spinel crystal structure and a region with a layered rock-salt crystal structure. FIG. 1 is a model diagram illustrating one particle of this novel material. The region with a spinel crystal structure preferably exists on the surface of the particle. For example, the region with a spinel crystal structure may exist as a layer on the surface of the particle and the region with a layered rock-salt crystal structure may exist inside the particle. In the case where the region with a spinel crystal structure exists as a layer, the layer does not have to cover the entire particle and may partly cover the particle.

FIG. 1 is a schematic diagram illustrating a cross section of the particle of one embodiment of the present invention. In FIG. 1, a region 102 including a crystal with a layered rock-salt crystal structure exists inside the particle, and a region 101 with a spinel crystal structure exists on the outside of the particle. When a lithium-ion secondary battery using this material as a positive electrode active material is charged or discharged, lithium of the crystal with a layered rock-salt crystal structure inside each particle is released or lithium is received by the crystal with a layered rock-salt crystal structure inside the particle, through the region with a spinel crystal structure existing on the surface of the particle.

Here, the region 101 may be crystals with a structure derived from a spinel crystal structure or crystals with a structure changed from a spinel crystal structure.

One embodiment of the present invention is a lithium manganese composite oxide where each particle includes a first region including a crystal with a layered rock-salt crystal structure and a second region including a crystal with a spinel crystal structure. The second region is in contact with the outside surface of the first region. Furthermore, in the above structure, the second region preferably covers 10% or more of the entire surface of the first region.

Another embodiment of the present invention is a lithium manganese composite oxide including a crystal with a spinel crystal structure on part of the surface of each particle including a crystal with a layered rock-salt crystal structure. The crystal with a spinel crystal structure covers 10% or more of the entire surface of the particle.

Another embodiment of the present invention is a lithium manganese composite oxide that is a particle having a first region with a layered rock-salt crystal structure. The particle has a second region with a spinel crystal structure on part of its surface. The second region includes a layered region. The thickness of the layered region is greater than or equal to 1 nm.

In the above structure, the layered rock-salt crystal structure is represented by $Li_rMn_{s-t}M_tO_3$. As to variables, $1.4 \leq r \leq 2$, $0.7 \leq s < 1.5$, $0 \leq t < 1.5$, and $s \geq t$ are satisfied. An element M is preferably silicon, phosphorus, or a metal element other than lithium and manganese.

A positive electrode active material that can be manufactured at low cost can be provided.

The amount of lithium ions that can be received and released in and from a positive electrode active material can be increased to achieve high capacity and high energy density of a secondary battery. A secondary battery having excellent cycle characteristics can be provided.

A positive electrode active material having high ion conductivity and high electric conductivity can be provided.

High capacity and high energy density of a positive electrode of a lithium-ion secondary battery can be achieved.

High capacity and high energy density of a lithium-ion secondary battery can be achieved.

A novel material can be provided. A novel positive electrode active material can be provided. A novel battery can be provided. A novel lithium-ion secondary battery can be provided.

Note that the description of these effects does not disturb the existence of other effects. One embodiment of the present invention does not have to achieve all the objects listed above. Other effects will be apparent from and can be derived from the description of the specification, the drawings, the claims, and the like.

BRIEF DESCRIPTION OF THE DRAWINGS

In the accompanying drawings:

FIGS. 7A1 to 7B2 illustrate examples of power storage devices;
FIG. 21 shows an analysis result of an electron beam diffraction pattern.

DETAILED DESCRIPTION OF THE INVENTION

Figure 1:
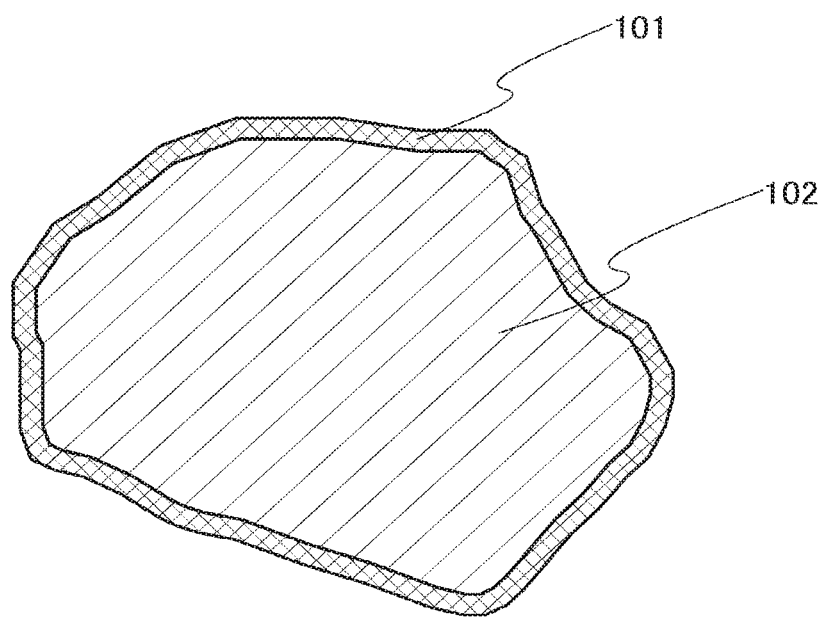
FIG. 1 is a model diagram illustrating one embodiment of the present invention.

Embodiments and examples of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to the description of the embodiments and examples.

Embodiment 1

In this embodiment, a region with a spinel crystal structure is formed on the outside of a region with a layered rock-salt crystal structure. The formation method is as follows.

In the case where a region with a spinel crystal structure exists as a layer, the layer covers preferably 10% or more, more preferably 30% or more of the entire surface of each particle. Furthermore, in the case where the region with a spinel crystal structure exists as a layer, the thickness of the layer is preferably greater than or equal to 1 nm, more preferably greater than or equal to 3 nm.

The composition of a layered rock-salt crystal structure inside the particle may be different from that of $Li_2Mn_{1-y}M_yO_3$ ($0 \leq y \leq 1$, the element M is silicon, phosphorus, or a metal element other than lithium and manganese). Here, a layered rock-salt crystal structure inside the particle is represented by $Li_rMn_{s-t}M_tO_3$. As to variables r and s, preferably, $1.4 \leq r \leq 2$ and $0.7 \leq s < 1.5$ are satisfied, and more preferably, $1.4 \leq r \leq 2$ and $0.8 \leq s < 1.4$ are satisfied. In addition, $0 \leq t < 1.5$ and $s \geq t$ are satisfied. Furthermore, Li, Mn, the element M, or O may be substituted by another constituent element (Li, Mn, the element M, or O); for example, part of Li in $Li_2Mn_{1-y}M_yO_3$ may be substituted by Mn or Ni.

[Synthesis of Lithium Manganese Composite Oxide]

A method for forming a lithium manganese composite oxide will be described in detail below. Although an example in which Ni is used as the element M is described in this embodiment, a similar effect can be obtained even when silicon, phosphorus, or a metal element other than lithium and manganese is appropriately used.

First, materials $Li_2CO_3$, $MnCO_3$, and NiO are weighed.

In this embodiment, the ratio of materials is adjusted on the basis of the idea of changing the composition of a lithium manganese composite oxide. The ratio is changed to form a lithium manganese composite oxide having a layered rock-salt crystal structure and a spinel crystal structure in each particle.

In the case where $Li_2CO_3$, $MnCO_3$, and NiO are used at a ratio of $Li_2CO_3$ to $MnCO_3$ and NiO is 1:0.7:0.3, $Li_2Mn_{0.7}Ni_{0.3}O_3$ is formed.

In this embodiment, $Li_2CO_3$, $MnCO_3$, and NiO are weighed such that the ratio of $Li_2CO_3$ to $MnCO_3$ and NiO is 0.84:0.8062:0.318. In other words, the amount of Li is reduced and the amount of Mn and the amount of Ni are increased compared with the case of forming $Li_2Mn_{0.7}Ni_{0.3}O_3$. Note that the ratio is represented as a molar ratio. Acetone is added to the powder of these materials, and then, they are mixed in a ball mill to prepare mixed powder.

After that, heating is performed to volatilize acetone, so that a mixed material is obtained.

Then, the mixed material is put into a melting pot, and is fired at a temperature in the range from 800° C. to 1100° C. in the air for 5 to 20 hours inclusive to synthesize a novel material.

Subsequently, grinding is performed to separate the sintered particles. For the grinding, acetone is added and then mixing is performed in a ball mill.

After the grinding, heating is performed to volatilize acetone, and then, vacuum drying is performed, so that a powdery lithium manganese composite oxide is obtained.

[Formation of Spinel Layer]

Next, a region with a spinel crystal structure is formed on the outside of a region with a layered rock-salt crystal structure. Examples of the formation method include a mechano-fusion method, a sol-gel method, a CVD method, and a spray drying method.

Here, a method of forming a spinel layer using a spray drying method will be described as an example. For example, it is assumed here that a surface is covered with $LiMn_2O_4$ having a spinel crystal structure. In that case, $Li(CH_3COO)$ as a Li supply source and $Mn(CH_3COO)_2 \cdot 4H_2O$ as a Mn supply source are weighed such that Li:Mn=1:2, which is the stoichiometric composition of $LiMn_2O_4$, is satisfied. Here, $Li(CH_3COO)$ and $Mn(CH_3COO)_2 \cdot 4H_2O$ are weighed such that the sum of the weights of $Li(CH_3COO)$ and $Mn(CH_3COO)_2 \cdot 4H_2O$ with respect to the weight of a lithium manganese composite oxide obtained by the above synthesis is greater than or equal to 0.1 weight % and less than or equal to 10 weight %.

Then, the weighed $Li(CH_3COO)$ and $Mn(CH_3COO)_2 \cdot 4H_2O$ are dissolved in pure water, and after that, the lithium manganese composite oxide is mixed into the mixture to form an aqueous solution. When the sum of the weights of $Li(CH_3COO)$, $Mn(CH_3COO)_2 \cdot 4H_2O$, and the lithium manganese composite oxide is w (g) and the volume of the aqueous solution is V (L), the concentration of the aqueous solution w/V (g/L) is preferably, for example, higher than or equal to 2 g/L and lower than or equal to 200 g/L.

Then, the obtained aqueous solution is processed by a spray drying method to obtain powder.

Then, the obtained powder is fired. The firing is performed at a temperature in the range from 300° C. to 1000° C. in the air or an atmosphere of a reducing gas such as nitrogen for 0.5 to 20 hours inclusive, so that the lithium manganese composite oxide whose surface is covered with a spinel layer is formed.

The use of this novel material as a positive electrode active material enables fabrication of a favorable positive electrode.

Embodiment 2

In this embodiment, to easily form a region with a spinel crystal structure on the outside of a region with a layered rock-salt crystal structure, a coating layer is formed and the region with a spinel crystal structure is stably formed.

In the case where the region with a spinel crystal structure exists as a layer, the layer covers preferably 10% or more, more preferably 30% or more of the entire surface of each particle. Furthermore, in the case where the region with a spinel crystal structure exists as a layer, the thickness thereof is preferably greater than or equal to 1 nm, more preferably greater than or equal to 3 nm.

The composition of a layered rock-salt crystal structure inside the particle may be different from that of $Li_2Mn_{1-y}M_yO_3$ ($0 \leq y \leq 1$, the element M is silicon, phosphorus, or a metal element other than lithium and manganese). Here, a layered rock-salt crystal structure inside the particle is represented by $Li_rMn_{s-t}M_tO_3$. As to variables r and s, preferably, $1.4 \leq r \leq 2$ and $0.7 \leq s < 1.5$ are satisfied, and more preferably, $1.4 \leq r \leq 2$ and $0.8 \leq s < 1.4$ are satisfied. In addition, $0 \leq t < 1.5$ and $s \geq t$ are satisfied. Furthermore, Li, Mn, the element M, or O may be substituted by another constituent element (Li, Mn, the element M, or O); for example, part of Li in $Li_2Mn_{1-y}M_yO_3$ may be substituted by Mn or Ni.

[Synthesis of Lithium Manganese Composite Oxide]

The method for forming a lithium manganese composite oxide in Embodiment 1 is employed.

[Formation of Coating Layer]

To form the region with a spinel crystal structure on the surface of the obtained lithium manganese composite oxide, the lithium manganese composite oxide is covered with a layer.

As a coating material, for example, a carbon material or a metal may be used. Alternatively, an oxide thereof may be used. Examples of oxides include metal oxides such as cobalt oxide, aluminum oxide, nickel oxide, and iron oxide and graphene oxide. When a carbon material is used, for example, the surface of the lithium manganese composite oxide can be reduced. When an oxide is used, for example, an effect of oxidizing a surface can be expected.

The thickness of the coating layer is preferably greater than or equal to 0.1 nm and less than or equal to 50 nm, more preferably greater than or equal to 1 nm and less than or equal to 10 nm.

An example of a coating method is as follows: a precursor of a coating material is dispersed or dissolved in a solution, the mixture is mixed with the lithium manganese composite oxide, and a reaction is caused by heat treatment or the like. For example, a sol-gel method can be employed as a coating method.

Examples of other coating methods include a mechano-fusion method, a CVD method, and a spray drying method.

For example, graphene oxide can be used as a coating material containing carbon. Note that graphene in this specification refers to single-layer graphene or multilayer graphene including two or more and a hundred or less layers. Single-layer graphene refers to a one-atom-thick sheet of carbon molecules having π bonds. Graphene oxide refers to a compound formed by oxidation of such graphene. Graphene oxide can be formed by various synthesis methods such as a Hummers method, a modified Hummers method, and oxidation of graphite. Graphene oxide may be reduced after being formed. The reduction of graphene oxide may be performed by heat treatment or by causing a reaction in a solvent containing a reducing agent. Note that it is possible that oxygen in graphene oxide is not necessarily entirely released and partly remains in the coating layer. The coating layer contains oxygen at higher than or equal to 2% and lower than or equal to 20%, preferably higher than or equal to 3% and lower than or equal to 15%.

The use of this novel material as a positive electrode active material enables fabrication of a favorable positive electrode.

Embodiment 3

In this embodiment, a method for forming a lithium manganese composite oxide of one embodiment of the present invention will be described in detail below.

In this embodiment, a compound containing lithium, manganese, oxygen, and a fourth element will be described as an example of a lithium manganese composite oxide. Here, nickel is used as the fourth element. Note that the use of silicon, phosphorus, or a metal element other than lithium and manganese as the fourth element instead of nickel, which is used in this embodiment, can provide a similar effect. In the case where the lithium manganese composite oxide of one embodiment of the present invention is particulate, a region with a spinel crystal structure preferably exists on the surface of each particle. For example, the region with a spinel crystal structure may exist as a layer on the surface of the particle and a region with a layered rock-salt crystal structure may exist inside the particle. In the case where the region with a spinel crystal structure exists as a layer, the layer does not have to cover the entire particle and may partly cover the particle.

In the case where a region with a spinel crystal structure exists as a layer, the layer covers preferably 10% or more, more preferably 30% or more of the entire surface of each particle. Furthermore, in the case where a spinel crystal structure exists as a layer, the thickness of the layer is preferably greater than or equal to 1 nm, more preferably greater than or equal to 3 nm.

The composition of a layered rock-salt crystal structure inside the particle may be different from that of $Li_2Mn_{1-y}M_yO_3$ ($0 \leq y \leq 1$, the element M is silicon, phosphorus, or a metal element other than lithium and manganese). Here, a layered rock-salt crystal structure inside the particle is represented by $Li_rMn_{s-t}M_tO_3$. As to variables r and s, preferably, $1.4 \leq r \leq 2$ and $0.7 \leq s < 1.5$ are satisfied, and more preferably, $1.4 \leq r \leq 2$ and $0.8 \leq s < 1.4$ are satisfied. In addition, $0 \leq t < 1.5$ and $s \geq t$ are satisfied. Furthermore, Li, Mn, the element M, or O may be substituted by another constituent element (Li, Mn, the element M, or O); for example, part of Li in $Li_2Mn_{1-y}M_yO_3$ may be substituted by Mn or Ni.

First, materials are weighed. In this embodiment, $Li_2CO_3$, $MnCO_3$, and NiO are used as the materials and weighed such that the molar ratio of $Li_2CO_3$ to $MnCO_3$ and NiO is 0.84:0.8062:0.318.

Next, acetone is added to a mixture of the materials and mixing is performed in a ball mill. After the mixing, heating is performed to volatilize acetone.

Then, the mixed material is put into a melting pot, and is fired. The firing is preferably performed at a temperature in the range from 800° C. to 1100° C. in the air for 5 to 20 hours inclusive. Although the firing is performed in the air here, the firing atmosphere is not limited to an air atmosphere and may be an air gas atmosphere, an oxygen gas atmosphere, or a mixed gas atmosphere of oxygen and nitrogen. Alternatively, in the case of using a material that is easily oxidized, an inert gas such as nitrogen or a rare gas may be used.

Particles that have been fired are sintered in some cases; thus, grinding is preferably performed to separate the sintered particles. For example, the grinding may be performed in a ball mill after acetone is added. The grinding can separate the sintered particles or aggregation of the plurality of particles and reduce the particles with a large size or aggregation of the plurality of particles. As a result, the particle size distribution can be narrowed. Thus, the use of powdery particles of one embodiment of the present invention as a positive electrode active material of a lithium-ion secondary battery can increase the charge and discharge rate of the battery. After the grinding, heating is performed to volatilize acetone. Then, drying is performed under reduced pressure.

After the drying under reduced pressure, firing may further be performed. The firing is preferably performed in the air. Alternatively, the firing may be performed in a mixed gas atmosphere of oxygen and nitrogen. The firing temperature may be in the range from 500° C. to 700° C., for example. In addition, the firing time may be 1 to 10 hours inclusive, for example.

Through the above steps, powdery particles of one embodiment of the present invention can be obtained. The use of the obtained powdery particles as a positive electrode active material enables fabrication of a favorable positive electrode.

Embodiment 4

In this embodiment, the structure of a storage battery including a positive electrode active material manufactured by the manufacturing method described in Embodiment 1 will be described with reference to FIG. 2A to 2C, FIGS. 3A and 3B, and FIGS. 4A and 4B.

(Coin-Type Storage Battery)

Figure 2A:
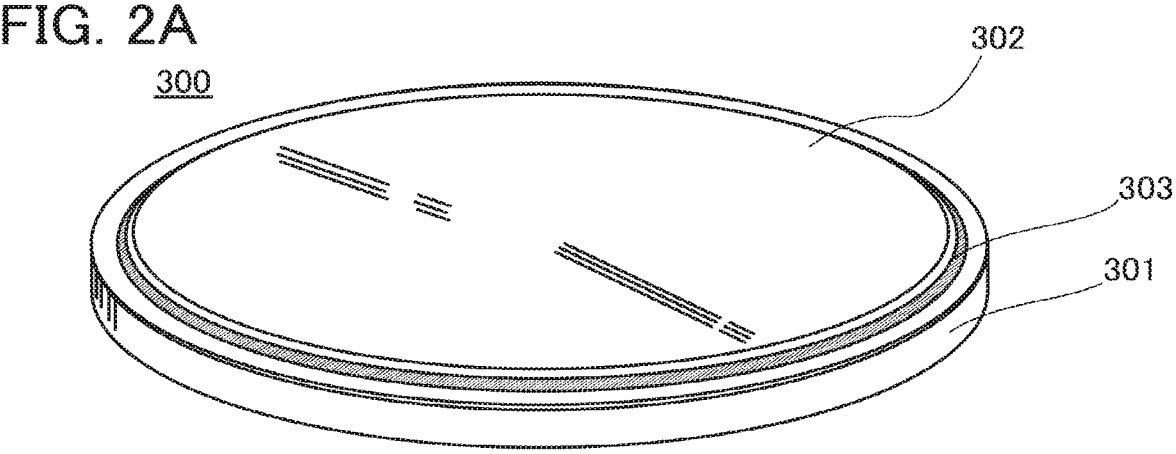
FIGS. 2A to 2C illustrate a coin-type storage battery.
Figure 2B:
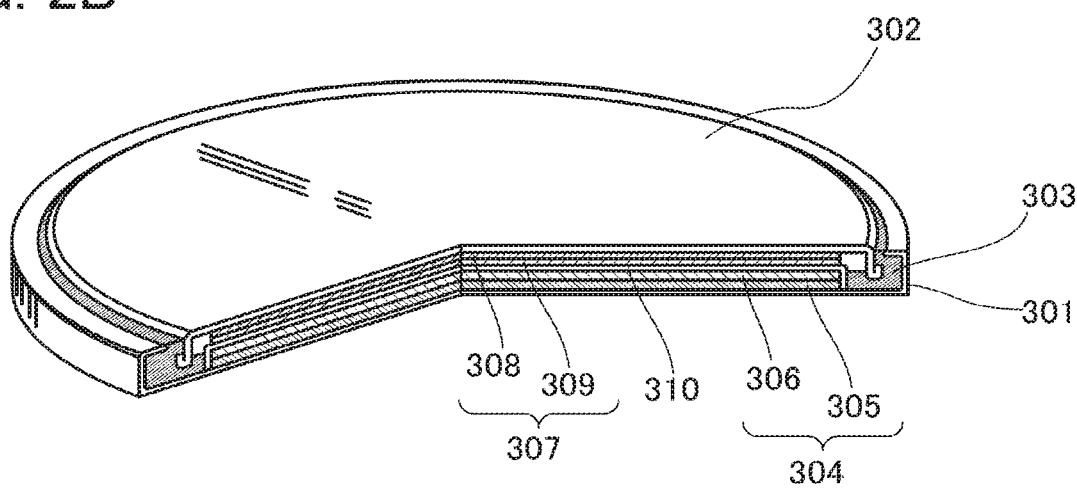

FIG. 2A is an external view of a coin-type (single-layer flat type) storage battery, and FIG. 2B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

A material with which lithium can be dissolved and precipitated or a material into and from which lithium ions can be inserted and extracted can be used for the negative electrode active materials used for the negative electrode active material layer 309; for example, a lithium metal, a carbon-based material, and an alloy-based material can be used. The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (e.g., 0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active materials, an alloy-based material which enables charge-discharge reactions by an alloying reaction and a dealloying reaction with lithium metal can be used. In the case where carrier ions are lithium ions, a material containing at least one of Ga, Al, Si, Ge, Sn, Pb, Sb, Bi, Ag, Au, Zn, Cd, In, and the like can be used for example. Such elements have higher capacity than carbon. In particular, silicon has a significantly high theoretical capacity of 4200 mAh/g. For this reason, silicon is preferably used for the negative electrode active materials. Examples of the alloy-based material using such elements include SiO, Mg$_2$Si, Mg$_2$Ge, SnO, SnO$_2$, Mg$_2$Sn, SnS$_2$, V$_2$Sn$_3$, FeSn$_2$, CoSn$_2$, Ni$_3$Sn$_2$, Cu$_6$Sn$_5$, Ag$_3$Sn, Ag$_3$Sb, Ni$_2$MnSb, CeSb$_3$, LaSn$_3$, La$_3$Co$_2$Sn$_7$, CoSb$_3$, InSb, SbSn, and the like. Here, SiO refers to a film in which the silicon content is higher than that in SiO$_2$.

Alternatively, for the negative electrode active materials, an oxide such as titanium dioxide (TiO$_2$), lithium titanium oxide (Li$_4$Ti$_5$O$_{12}$), lithium-graphite intercalation compound (Li$_x$C$_6$), niobium pentoxide (Nb$_2$O$_5$), tungsten oxide (WO$_2$), and molybdenum oxide (MoO$_2$) can be used.

Still alternatively, for the negative electrode active materials, Li$_{3-x}$M$_x$N (M=Co, Ni, or Cu) with a Li$_3$N structure, which is a nitride containing lithium and a transition metal, can be used. For example, Li$_{2.6}$Co$_{0.4}$N$_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as V$_2$O$_5$ or Cr$_3$O$_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as Fe$_2$O$_3$, CuO, Cu$_2$O, RuO$_2$, and Cr$_2$O$_3$, sulfides such as CoS$_{0.89}$, NiS, and CuS, nitrides such as Zn$_3$N$_2$, Cu$_3$N, and Ge$_3$N$_4$, phosphides such as NiP$_2$, FeP$_2$, and CoP$_3$, and fluorides such as FeF$_3$ and BiF$_3$.

The current collectors 305 and 308 can each be formed using a highly conductive material which is not alloyed with a carrier ion of lithium among other elements, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 μm to 30 μm inclusive.

The positive electrode active materials described in Embodiment 1 can be used for the positive electrode active material layer 306.

As the separator 310, an insulator such as cellulose (paper), polyethylene, and polypropylene with pores can be used.

As an electrolyte of an electrolytic solution, a material which contains carrier ions is used. Typical examples of the electrolyte are lithium salts such as LiPF$_6$, LiClO$_4$, LiAsF$_6$, LiBF$_4$, LiCF$_3$SO$_3$, Li(CF$_3$SO$_2$)$_2$N, and Li(C$_2$F$_5$SO$_2$)$_2$N. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the supporting electrolyte.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 2B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 2C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the terms "anode" or "cathode" is used, it should be mentioned that the anode or the cathode is which of the one at the time of charging or the one at the time of discharging and corresponds to which of a positive electrode or a negative electrode.

Figure 2C:
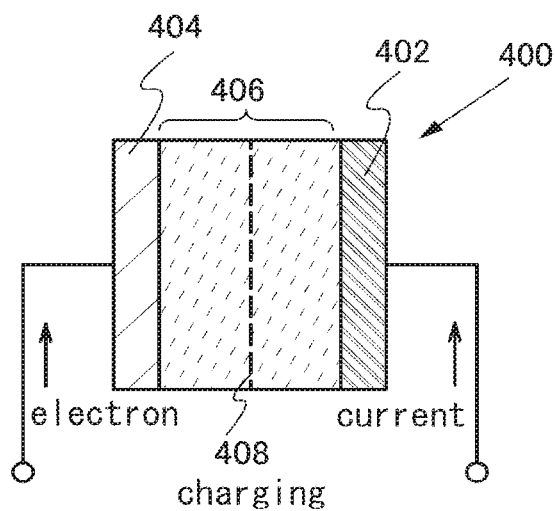

Two terminals in FIG. 2C are connected to a charger, and a storage battery 400 is charged. As the charge of the storage battery 400 proceeds, a potential difference between electrodes increases. The positive direction in FIG. 2C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

[Cylindrical Storage Battery]

Figure 3A:
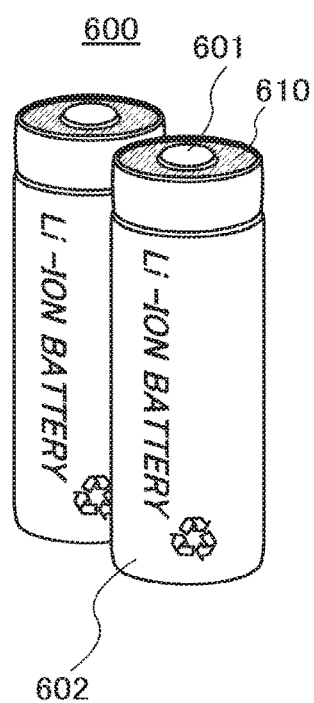
FIGS. 3A and 3B illustrate a cylindrical storage battery.

Next, an example of a cylindrical storage battery will be described with reference to FIGS. 3A and 3B. As illustrated in FIG. 3A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 3B:
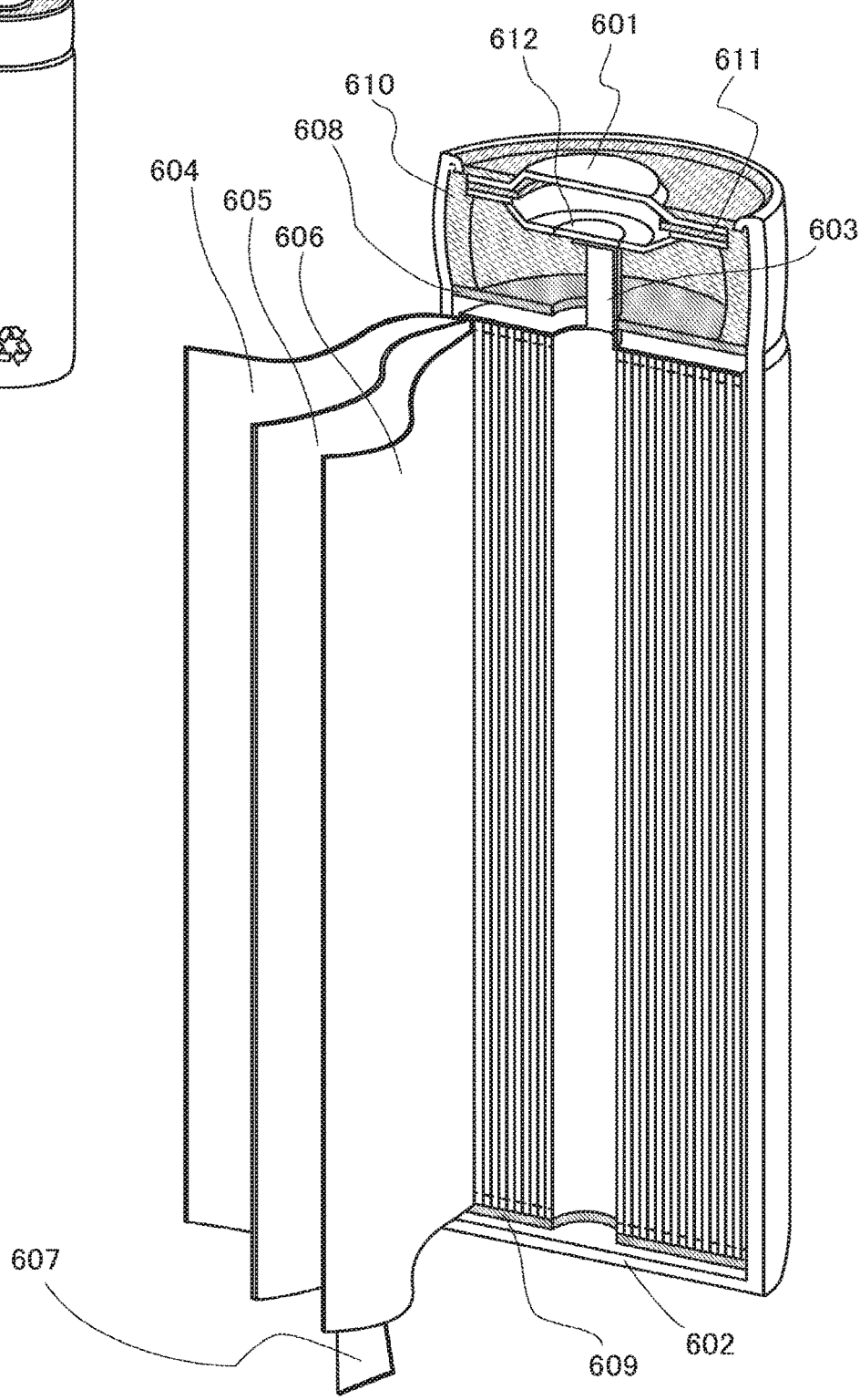

FIG. 3B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate (BaTiO$_3$)-based semiconductor ceramic can be used for the PTC element.

[Laminated Storage Battery]

Next, an example of a laminated storage battery will be described with reference to FIG. 4A. When a flexible laminated storage battery is used in an electronic device at least part of which is flexible, the storage battery can be bent as the electronic device is bent.

Figure 4A:
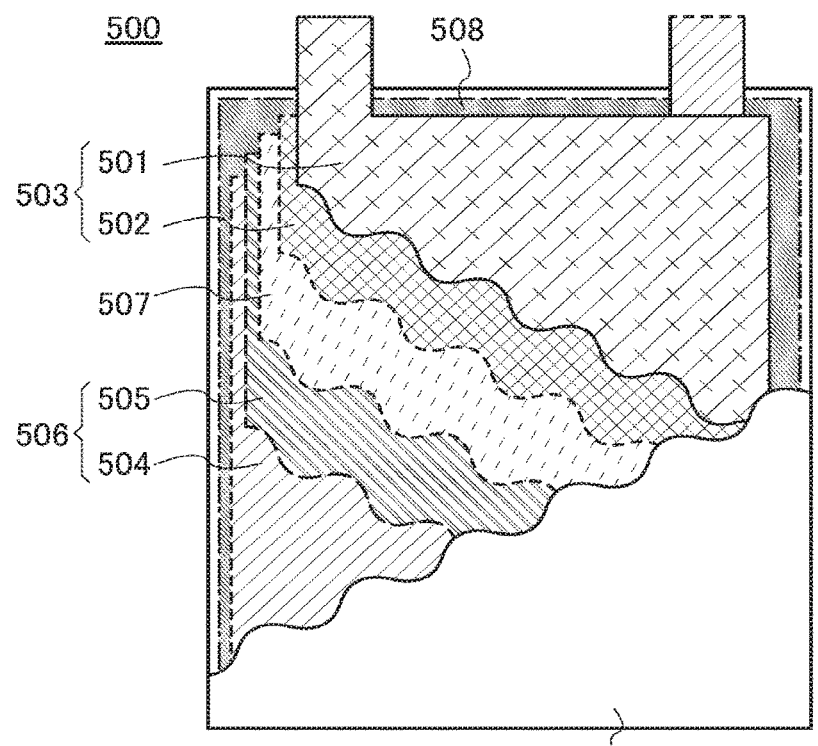
FIGS. 4A and 4B illustrate a laminated storage battery.

A laminated storage battery 500 illustrated in FIG. 4A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509. The positive electrode active materials described in Embodiment 1 can be used for the positive electrode active material layer 502.

In the laminated storage battery 500 illustrated in FIG. 4A, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside the exterior body 509.

As the exterior body 509 in the laminated storage battery 500, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Figure 4B:
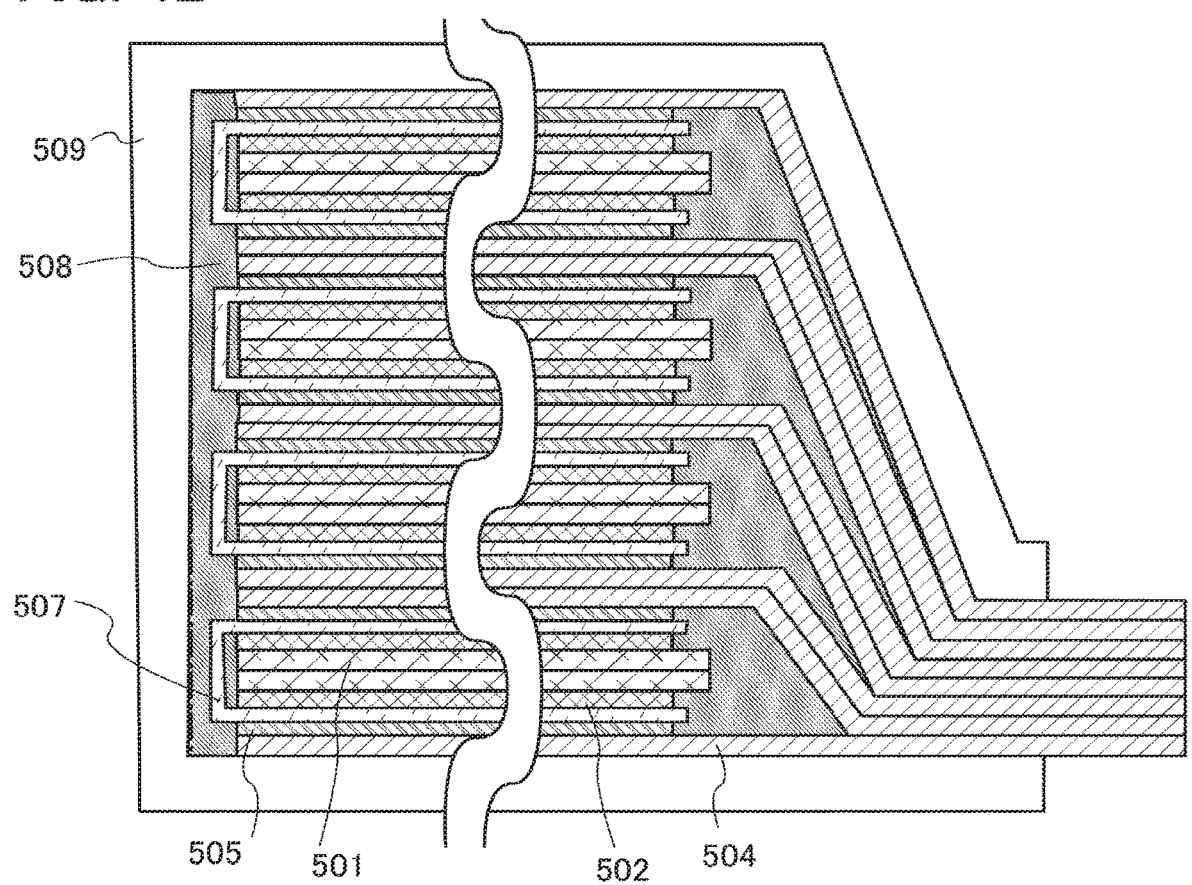

FIG. 4B illustrates an example of a cross-sectional structure of the laminated storage battery 500. FIG. 4A illustrates an example of including only two current collectors for simplicity, and the actual battery includes a plurality of electrode layers.

The example in FIG. 4B includes 16 electrode layers. The laminated storage battery 500 has flexibility even though including 16 electrode layers. In FIG. 4B, 8 negative electrode current collectors 504 and 8 positive electrode current collectors 501 are included. Note that FIG. 4B illustrates a cross section of the lead portion of the negative electrode, and 8 negative electrode current collectors 504 are bonded to each other by ultrasonic welding. It is needless to say that the number of electrode layers is not limited to 16, and may be more than 16 or less than 16. In the case of using a large number of electrode layers, the storage battery can have high capacity. In contrast, in the case of using a small number of electrode layers, the storage battery can have a small thickness and high flexibility.

Figure 32:
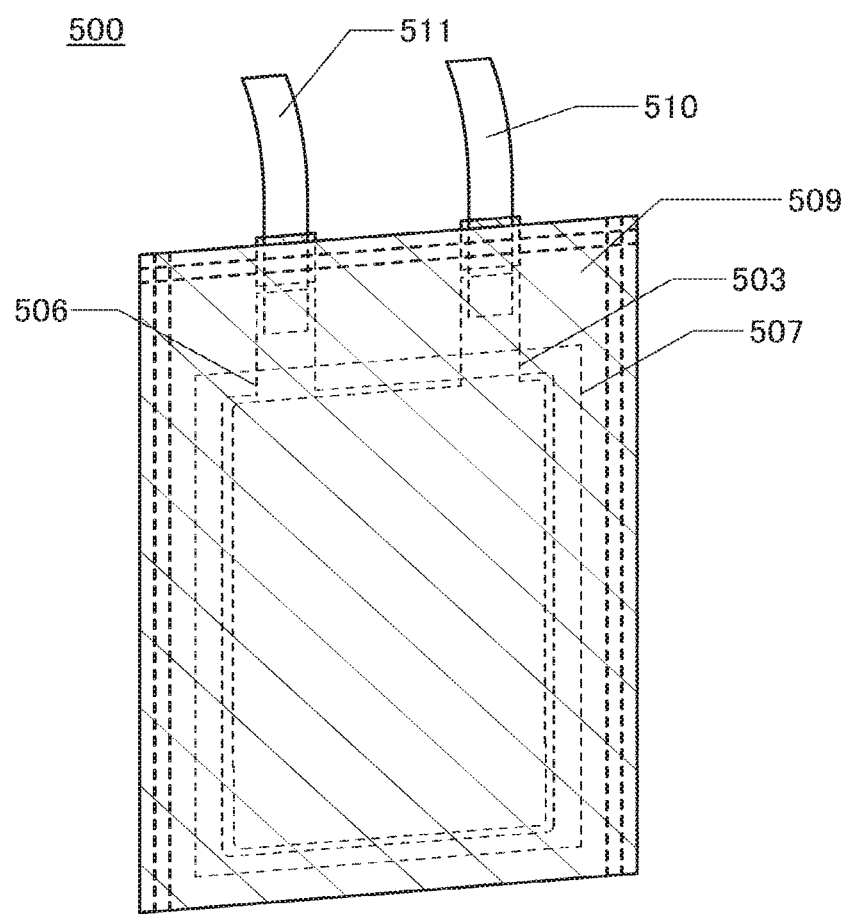
FIG. 32 is an external view of a storage battery.
Figure 33:
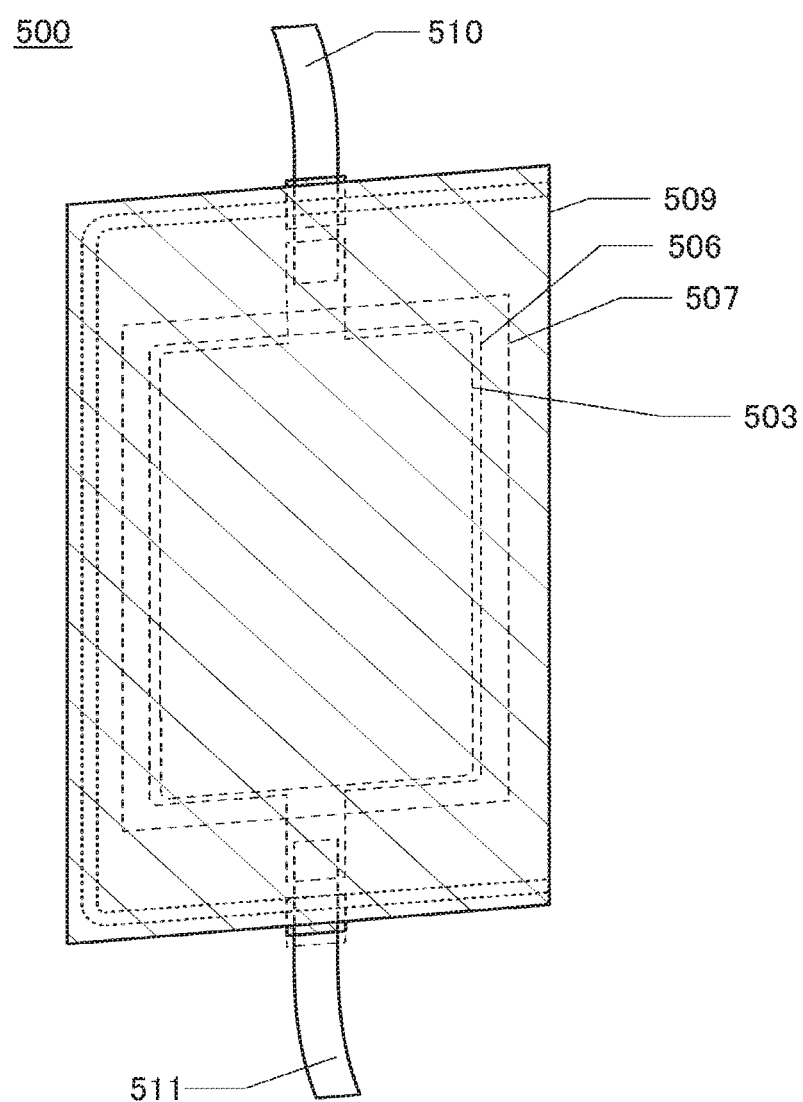
FIG. 33 is an external view of a storage battery.

FIGS. 32 and 33 each illustrate an example of the external view of the laminated storage battery 500. In FIGS. 32 and 33, the positive electrode 503, the negative electrode 506, the separator 507, the exterior body 509, a positive electrode lead electrode 510, and a negative electrode lead electrode 511 are included.

Figure 34A:
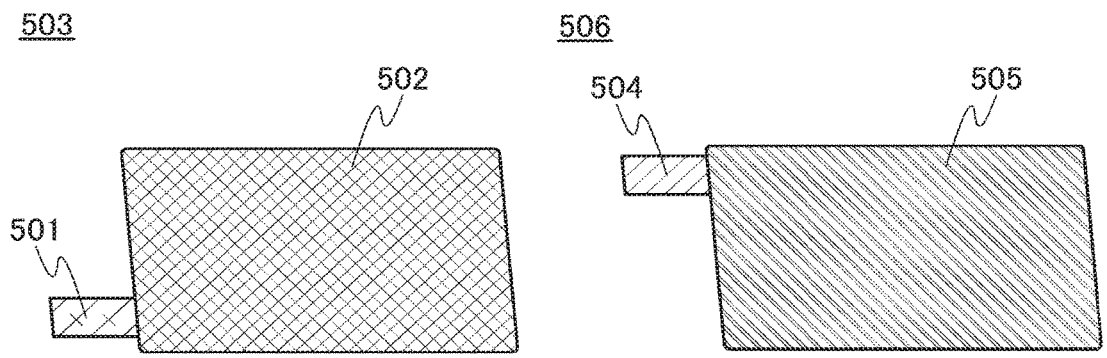
FIGS. 34A to 34C illustrate a method for fabricating a storage battery.

FIG. 34A illustrates the external views of the positive electrode 503 and the negative electrode 506. The positive electrode 503 includes the positive electrode current collector 501, and the positive electrode active material layer 502 is formed over a surface of the positive electrode current collector 501. The positive electrode 503 also includes a region where the positive electrode current collector 501 is partly exposed (hereinafter also referred to as a tab region). The negative electrode 506 includes the negative electrode current collector 504, and the negative electrode active material layer 505 is formed over a surface of the negative electrode current collector 504. The negative electrode 506 also includes a region where the negative electrode current collector 504 is partly exposed, that is, a tab region. The areas and shapes of the tab regions included in the positive electrode and negative electrode are not limited to those illustrated in FIG. 34A.

[Method for Fabricating Laminated Storage Battery]

Figure 34B:
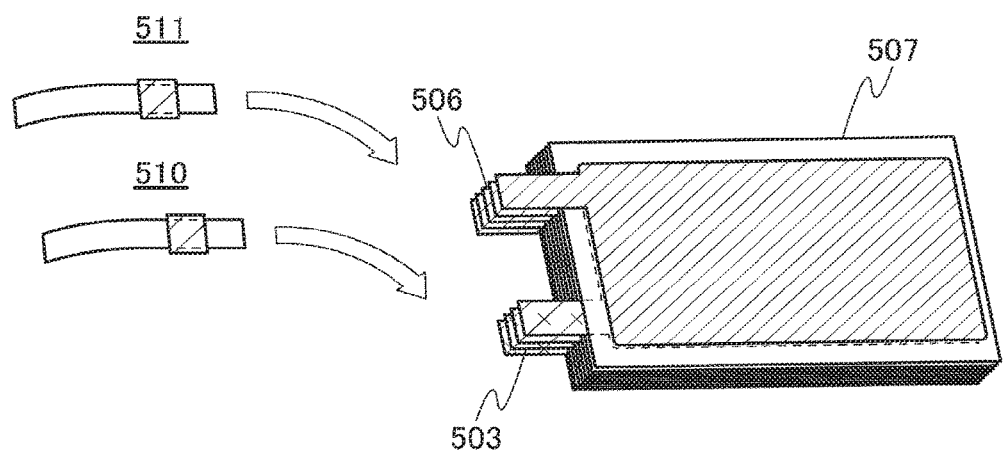

Here, an example of a method for fabricating the laminated storage battery whose external view is illustrated in FIG. 32 will be described with reference to FIGS. 34B and 34C.

First, the negative electrode 506, the separator 507, and the positive electrode 503 are stacked. FIG. 34B illustrates a stack including the negative electrode 506, the separator 507, and the positive electrode 503. The battery described here as an example includes 5 negative electrodes and 4 positive electrodes. Next, the tab regions of the positive electrodes 503 are bonded to each other, and the tab region of the positive electrode of the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode of the outermost surface and the negative electrode lead electrode 511 are bonded to each other.

After that, the negative electrode 506, the separator 507, and the positive electrode 503 are placed over the exterior body 509.

Figure 34C:
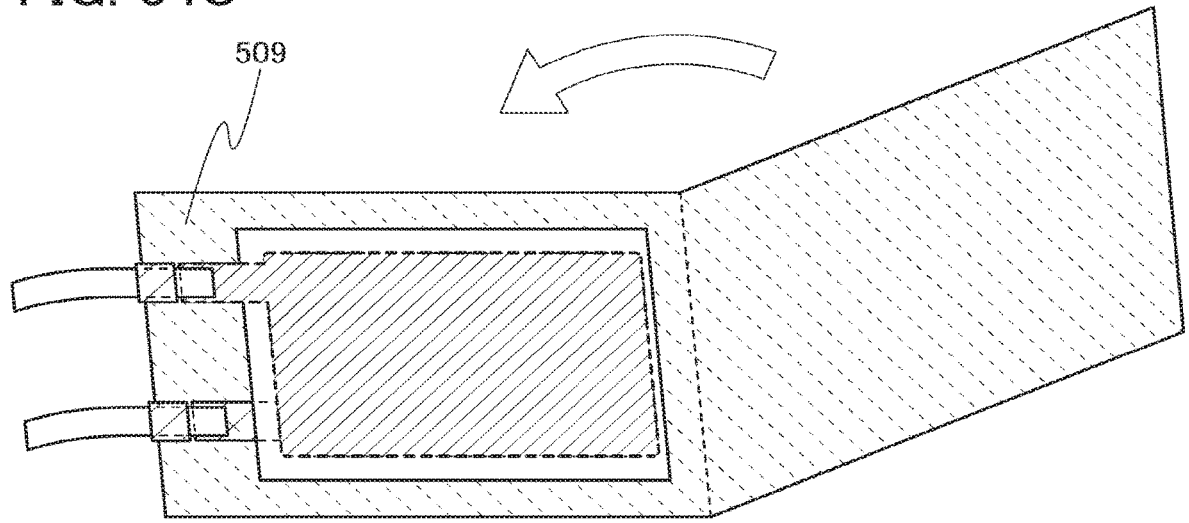

Subsequently, the exterior body 509 is folded along a dashed line as illustrated in FIG. 34C. Then, the outer edge of the exterior body 509 is bonded. The bonding can be performed by thermocompression, for example. At this time, a part (or one side) of the exterior body 509 is left unbonded (to provide an inlet) so that the electrolytic solution 508 can be introduced later.

Next, the electrolytic solution 508 is introduced into the exterior body 509 from the inlet of the exterior body 509. The electrolytic solution 508 is preferably introduced in a reduced pressure atmosphere or in an inert gas atmosphere. Lastly, the inlet is bonded. In the above manner, the laminated storage battery 500 can be fabricated.

Note that in this embodiment, the coin-type storage battery, the laminated storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the positive electrodes of the storage batteries 300, 500, and 600, which are described in this embodiment, the positive electrode active material layer of one embodiment of the present invention can be used. Thus, the discharge capacity of the storage batteries 300, 500, and 600 can be increased.

FIGS. 5A to 5E illustrate examples of electronic devices including flexible laminated storage batteries. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 5A:
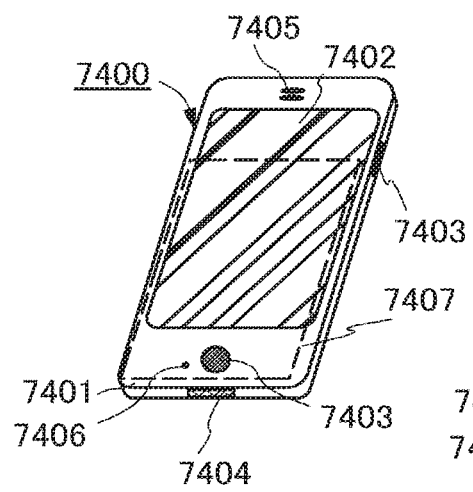
FIGS. 5A to 5E illustrate flexible laminated storage batteries.

FIG. 5A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 5B:
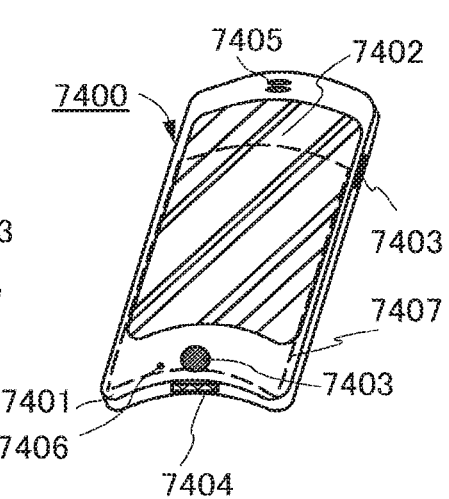
Figure 5C:
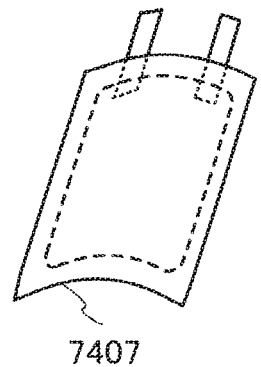

FIG. 5B illustrates the mobile phone 7400 that is bent. When the whole mobile phone 7400 is bent by the external force, the power storage device 7407 included in the mobile phone 7400 is also bent. FIG. 5C illustrates the bent power storage device 7407. The power storage device 7407 is a laminated storage battery.

Figure 5D:
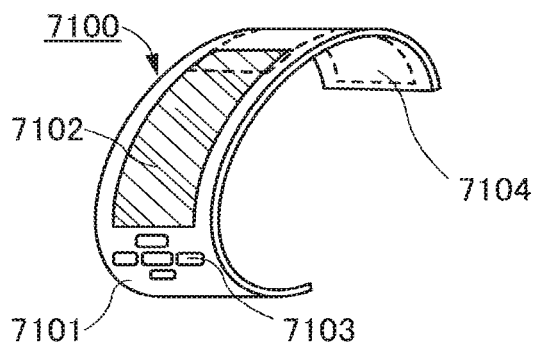
Figure 5E:
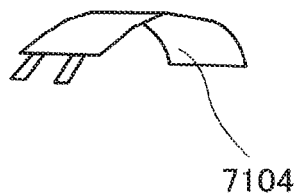

FIG. 5D illustrates an example of a bangle display device. A portable display device 7100 includes a housing 7101, a display portion 7102, an operation button 7103, and a power storage device 7104. FIG. 5E illustrates the bent power storage device 7104.

[Structural Example of Power Storage Device]

Structural examples of power storage devices will be described with reference to FIGS. 6A and 6B, FIGS. 7A1 to 7B2, FIGS. 8A and 8B, FIGS. 9A and 9B, and FIG. 10.

Figure 6A:
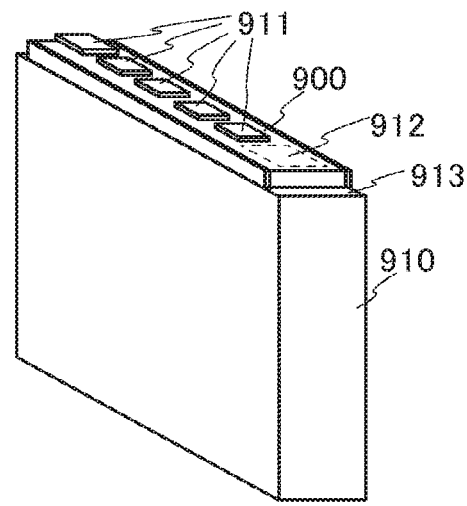
FIGS. 6A and 6B illustrate an example of a power storage device.
Figure 6B:
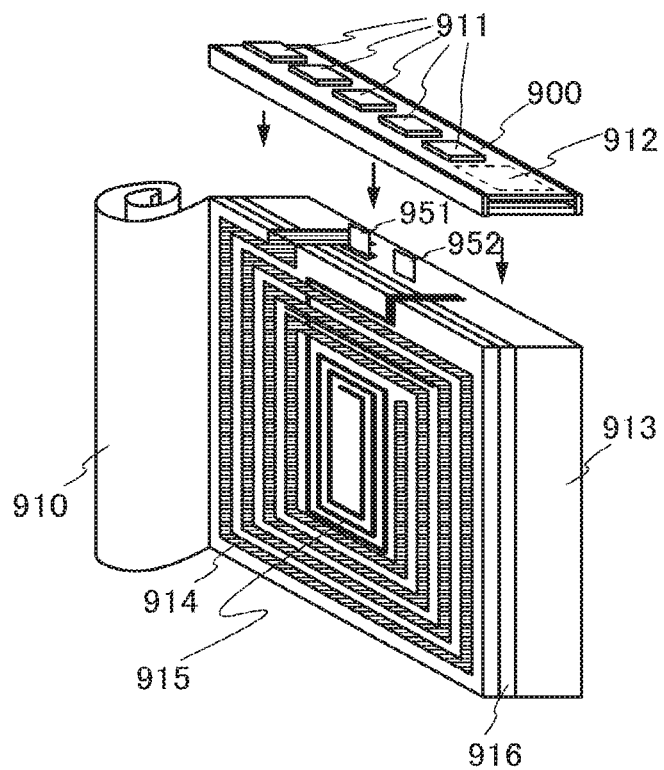

FIGS. 6A and 6B are external views of a power storage device. The power storage device includes a circuit board 900 and a storage battery 913. A label 910 is attached to the storage battery 913. As shown in FIG. 6B, the power storage device further includes a terminal 951 and a terminal 952, and includes an antenna 914 and an antenna 915 between the storage battery 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the storage battery 913 and the antennas 914 and 915. The layer 916 may have a function of preventing an adverse effect on an electromagnetic field by the storage battery 913. As the layer 916, for example, a magnetic body can be used.

Note that the structure of the power storage device is not limited to that shown in FIGS. 6A and 6B.

For example, as shown in FIGS. 7A1 and 7A2, two opposite surfaces of the storage battery 913 in FIGS. 6A and 6B may be provided with respective antennas. FIG. 7A1 is an external view showing one side of the opposite surfaces, and FIG. 7A2 is an external view showing the other side of the opposite surfaces. For portions similar to those in FIGS. 6A and 6B, a description of the power storage device illustrated in FIGS. 6A and 6B can be referred to as appropriate.

As illustrated in FIG. 7A1, the antenna 914 is provided on one of the opposite surfaces of the storage battery 913 with the layer 916 interposed therebetween, and as illustrated in FIG. 7A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 7B1 and 7B2, two opposite surfaces of the storage battery 913 in FIGS. 6A and 6B may be provided with different types of antennas. FIG. 7B1 is an external view showing one side of the opposite surfaces, and FIG. 7B2 is an external view showing the other side of the opposite surfaces. For portions similar to those in FIGS. 6A and 6B, a description of the power storage device illustrated in FIGS. 6A and 6B can be referred to as appropriate.

As illustrated in FIG. 7B1, the antenna 914 is provided on one of the opposite surfaces of the storage battery 913 with the layer 916 interposed therebetween, and as illustrated in FIG. 7B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 8A:
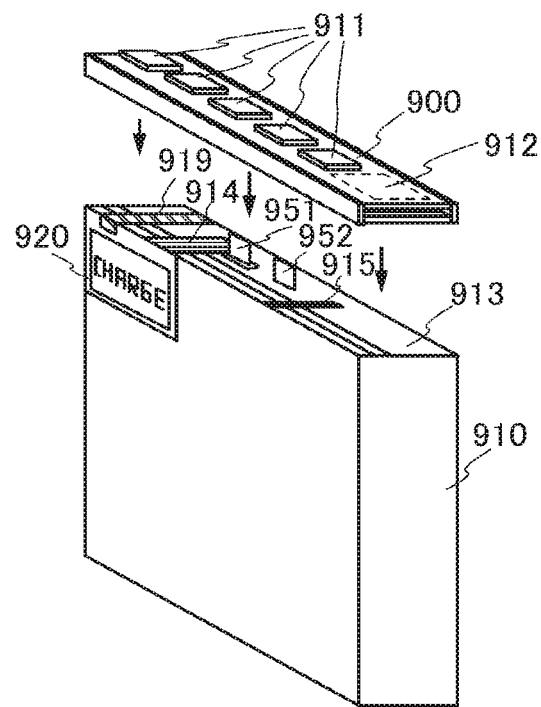
FIGS. 8A and 8B illustrate examples of power storage devices.

Alternatively, as illustrated in FIG. 8A, the storage battery 913 in FIGS. 6A and 6B may be provided with a display device 920. The display device 920 is electrically connected to the terminal 911 via a terminal 919. It is possible that the label 910 is not provided in a portion where the display device 920 is provided. For portions similar to those in FIGS. 6A and 6B, a description of the power storage device illustrated in FIGS. 6A and 6B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 8B:
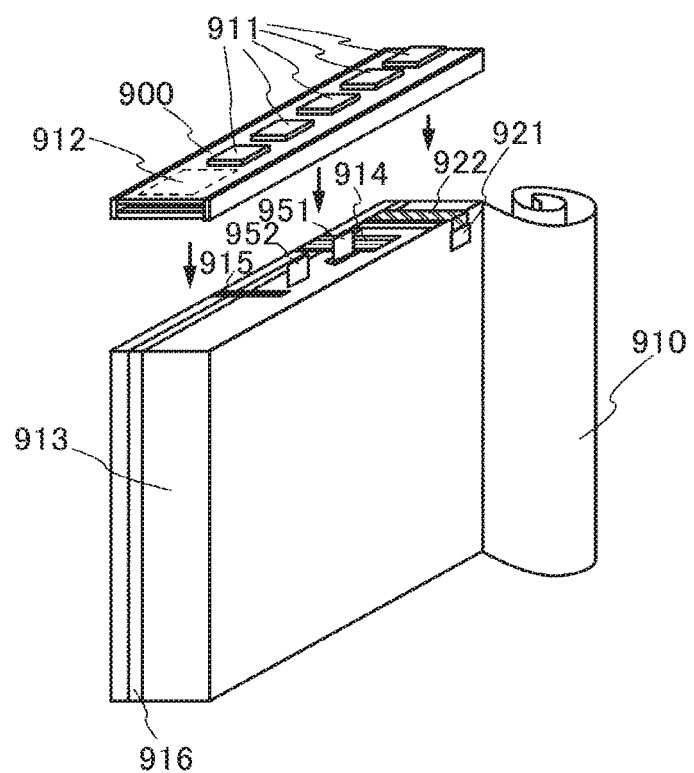

Alternatively, as illustrated in FIG. 8B, the storage battery 913 illustrated in FIGS. 6A and 6B may be provided with a sensor 921. The sensor 921 is electrically connected to the terminal 911 via a terminal 922. Note that the sensor 921 may be provided between the storage battery 913 and the label 910. For portions similar to those in FIGS. 6A and 6B, a description of the power storage device illustrated in FIGS. 6A and 6B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be determined and stored in a memory inside the circuit 912.

Furthermore, structural examples of the storage battery 913 will be described with reference to FIGS. 9A and 9B and FIG. 10.

Figure 9A:
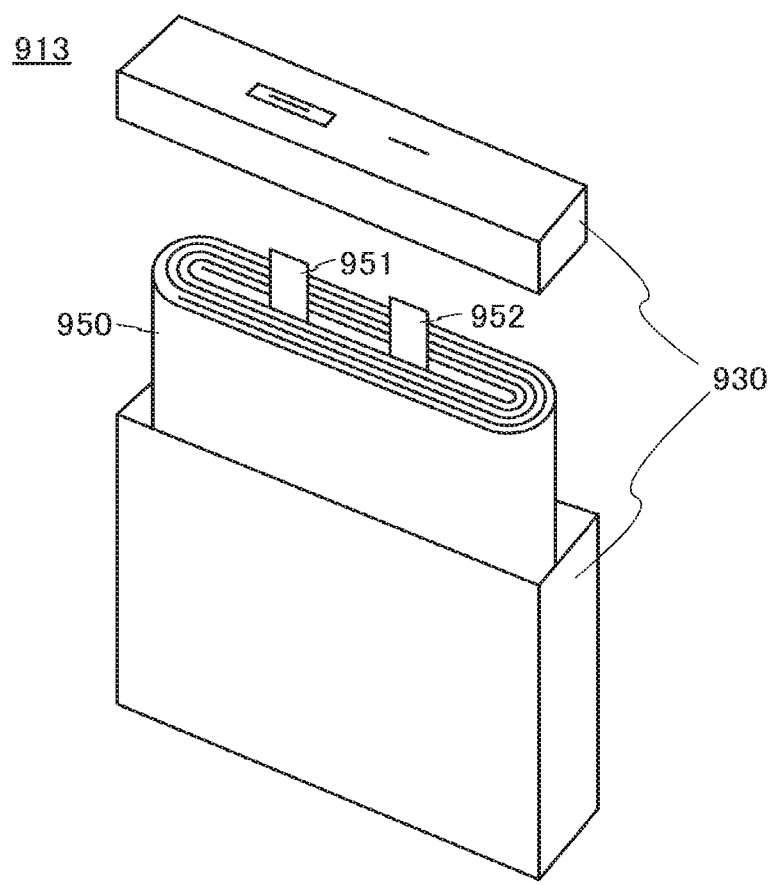
FIGS. 9A and 9B illustrate example of power storage devices.

The storage battery 913 illustrated in FIG. 9A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 9A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 9B:
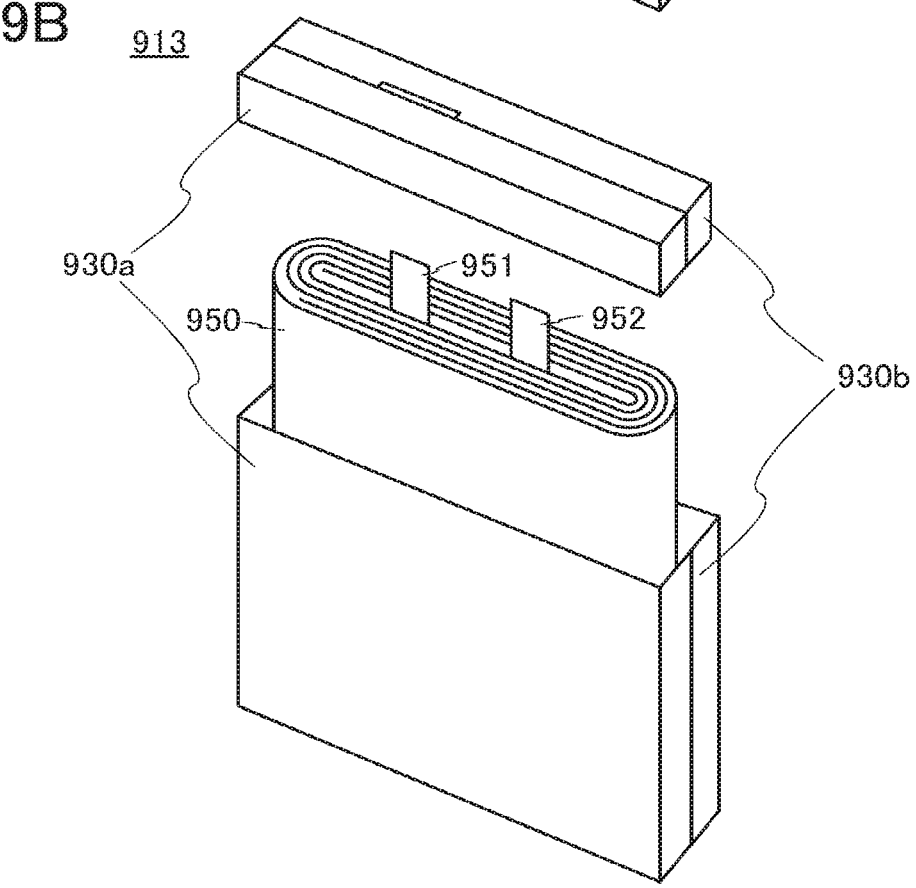

Note that as illustrated in FIG. 9B, the housing 930 in FIG. 9A may be formed using a plurality of materials. For example, in the storage battery 913 in FIG. 9B, a housing 930*a* and a housing 930*b* are bonded to each other and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field by the storage battery 913 can be prevented. When an electric field is not significantly blocked by the housing 930*a*, an antenna such as the antennas 914 and 915 may be provided inside the housing 930*a*. For the housing 930*b*, a metal material can be used, for example.

Figure 10:
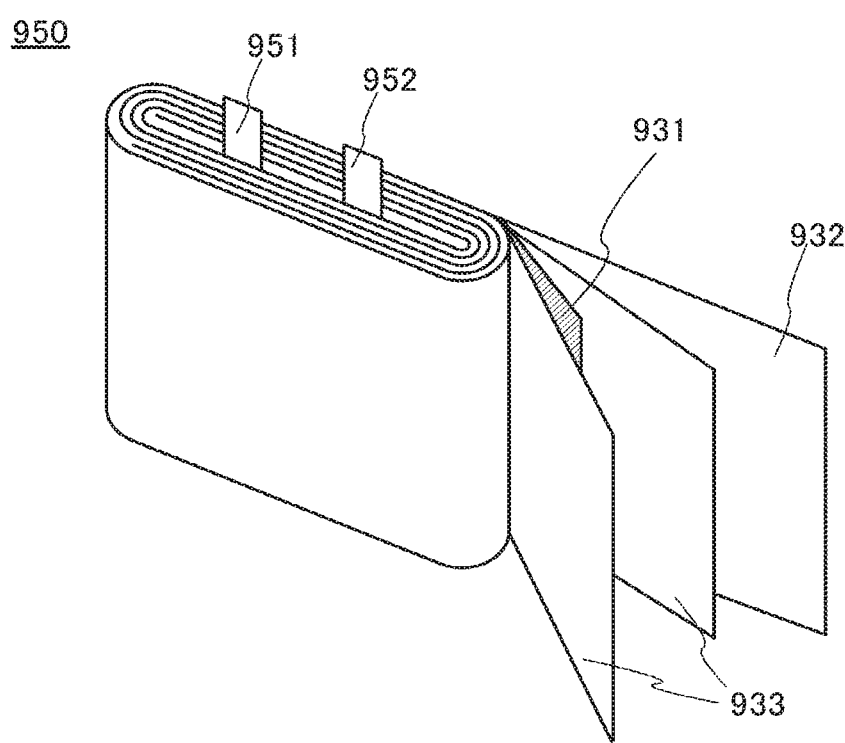
FIG. 10 illustrates an example of a power storage device.

FIG. 10 illustrates the structure of the wound body 950. The wound body 950 includes a negative electrode 931, a positive electrode 932, and a separator 933. The wound body 950 is obtained by winding a sheet of a stack in which the negative electrode 931 overlaps with the positive electrode 932 with the separator 933 provided therebetween. Note that a plurality of stacks of the negative electrode 931, the positive electrode 932, and the separator 933 may be stacked.

The negative electrode 931 is connected to the terminal 911 in FIGS. 6A and 6B via one of the terminals 951 and 952. The positive electrode 932 is connected to the terminal 911 in FIGS. 6A and 6B via the other of the terminals 951 and 952.

[Examples of Electrical Devices: Vehicles]

Next, examples where a storage battery is used in a vehicle will be described. The use of storage batteries in vehicles enables production of next-generation clean energy vehicles such as hybrid electric vehicles (HEVs), electric vehicles (EVs), and plug-in hybrid electric vehicles (PHEVs).

Figure 11A:
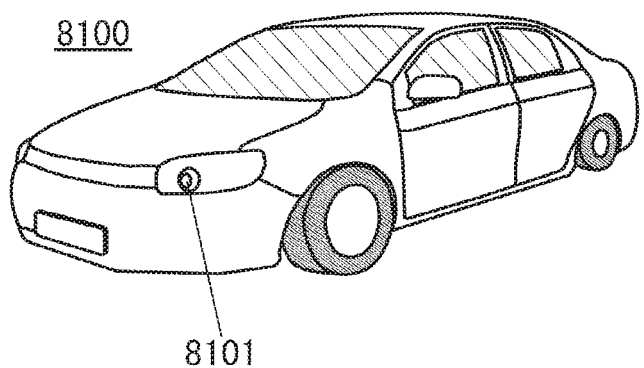
FIGS. 11A and 11B illustrate application examples of a power storage device.
Figure 11B:
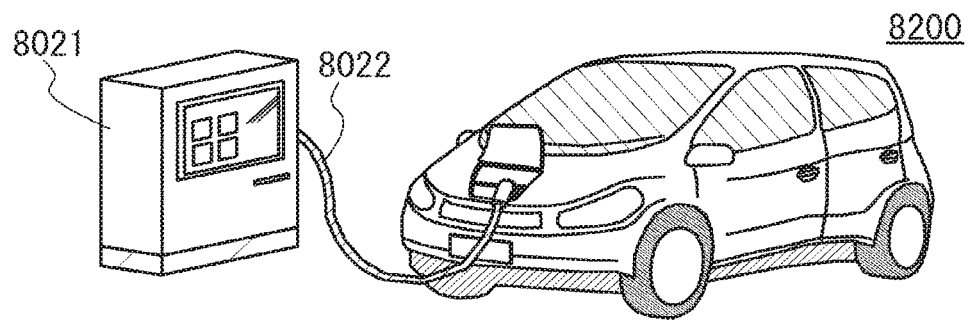

FIGS. 11A and 11B each illustrate an example of a vehicle using one embodiment of the present invention. An automobile 8100 illustrated in FIG. 11A is an electric vehicle that runs on the power of an electric motor. Alternatively, the automobile 8100 is a hybrid electric vehicle capable of driving appropriately using either the electric motor or the engine. One embodiment of the present invention can provide a high-mileage vehicle. The automobile 8100 includes the power storage device. The power storage device is used not only for driving the electric motor, but also for supplying electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 11B illustrates an automobile 8100 including the power storage device. The automobile 8100 can be charged when the power storage device is supplied with electric power through external charging equipment by a plug-in system, a contactless power feeding system, or the like. In FIG. 11B, the power storage device included in the automobile 8100 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device 8024 included in the automobile 8100 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in combination with any of the other embodiments as appropriate.

Example 1

[Synthesis of Powder]

In this example, a lithium manganese composite oxide containing lithium, manganese, oxygen, and nickel was synthesized. As starting materials, $Li_2CO_3$, $MnCO_3$, and NiO were used and weighed such that the molar ratio of $Li_2CO_3$ to $MnCO_3$ and NiO was 0.84:0.8062:0.318.

Next, acetone was added to a mixture of the materials and mixing was performed in a ball mill. After the mixing, heating was performed to volatilize acetone.

Then, the mixed material was put into a melting pot, and was fired at 1000° C. in the air for 10 hours.

Then, particles that have been fired were ground. The grinding was performed in a ball mill after acetone was added. After that, heating was performed to volatilize acetone.

Then, drying was performed under reduced pressure. Through the above steps, a powdery sample of one embodiment of the present invention was obtained.

[Measurement of Particle Size Distribution]

Figure 12:
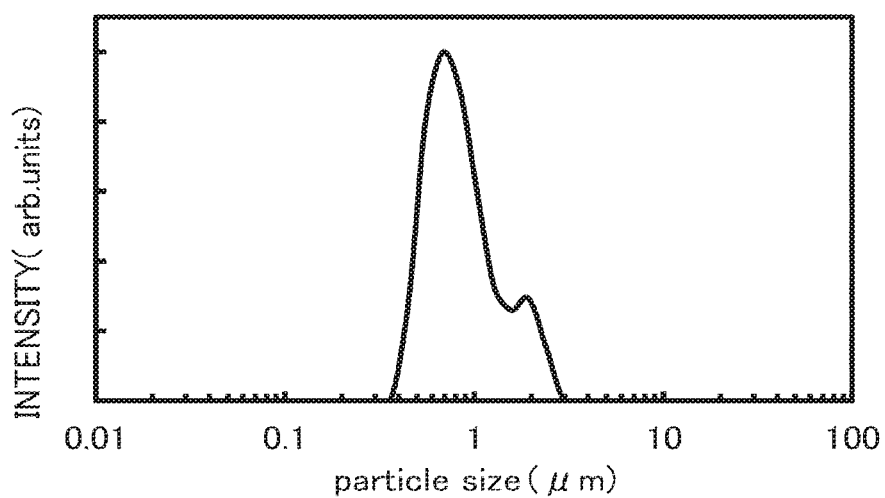
FIG. 12 shows the distribution of particle size.

The particle size of the obtained powdery sample of one embodiment of the present invention was measured using a laser diffraction particle size analyzer (SALD-2200 manufactured by Shimadzu Corporation). A laser diffraction and scattering method was used as a method for calculating the particle size. The values of D50 (the particle size when the particle size cumulative amount of particles on a particle size cumulative amount curve obtained as a result of particle size measurement is 50%) and D90 (the particle size when the particle size cumulative amount of particles on a particle size cumulative amount curve obtained as a result of particle size measurement is 90%) were 0.717 μm and 1.567 μm, respectively. FIG. 12 shows the obtained particle size distribution.

[Observation of Nanobeam Electron Diffraction Patterns]

Figure 13:
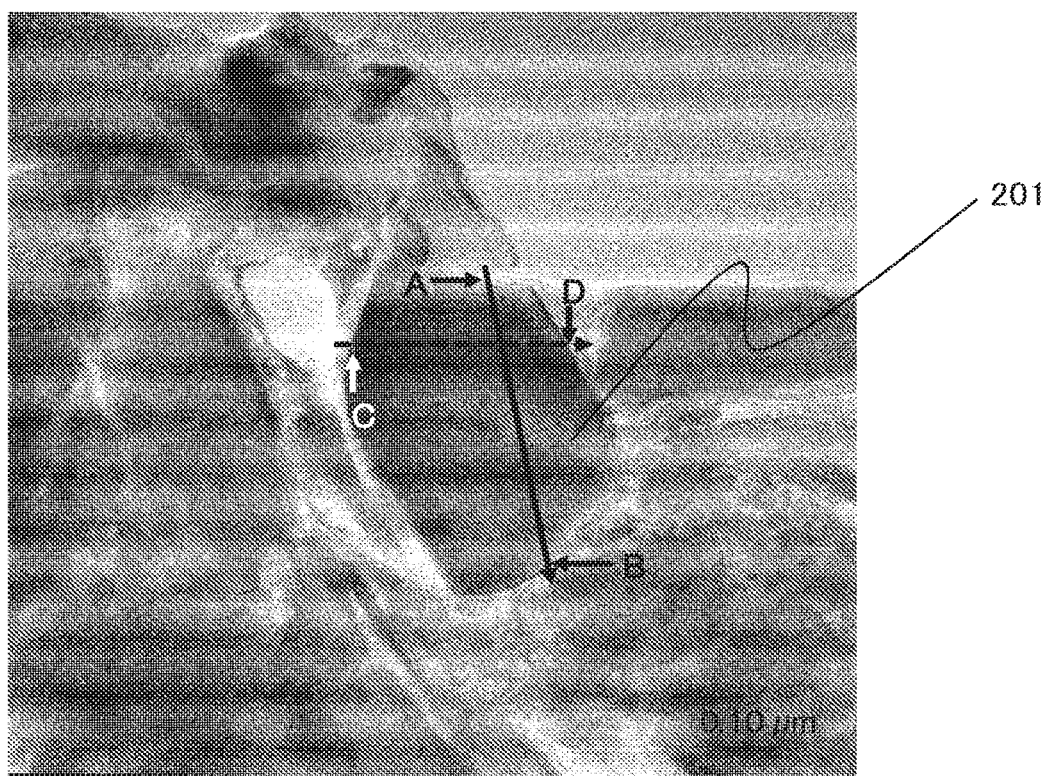
FIG. 13 shows a cross section observed with a transmission electron microscope.

Next, the formed powdery sample was sliced using a focused ion beam system (FIB) and then a cross section thereof was observed with a transmission electron microscope (TEM). FIG. 13 shows the result.

Next, transmission electron diffraction patterns of a particle 201 illustrated in FIG. 13 were observed by a nanobeam electron diffraction method. Here, an electron diffraction pattern obtained with an electron beam having a beam diameter of 10 nmφ or smaller, or 5 nmφ or smaller, is called a nanobeam electron diffraction pattern.

By moving a sample stage little by little, scanning was performed along the arrow indicated by a solid line including an observation point A and an observation point B to observe the transmission electron diffraction patterns. The diffraction patterns were observed at intervals of 0.5 s. The distance between the observation points A and B in FIG. 13 is approximately 375 nm. The observation time was 95.5 s in total.

Figure 14:
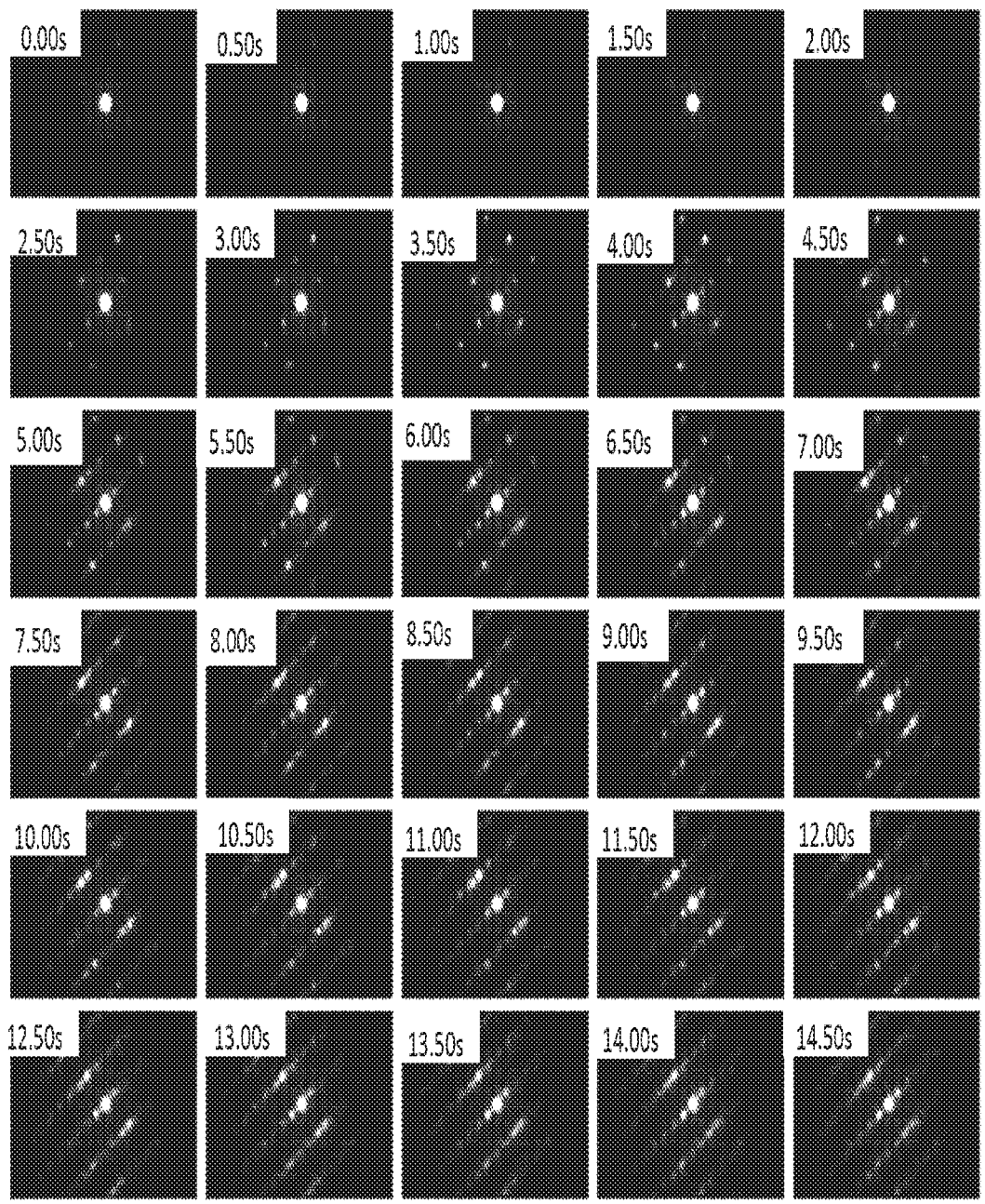
FIG. 14 shows electron diffraction patterns.
Figure 15:
FIG. 15 shows electron diffraction patterns.
Figure 16:
FIG. 16 shows electron diffraction patterns.
Figure 17:
FIG. 17 shows electron diffraction patterns.
Figure 18:
FIG. 18 shows electron diffraction patterns.
Figure 19:
FIG. 19 shows electron diffraction patterns.
Figure 20:
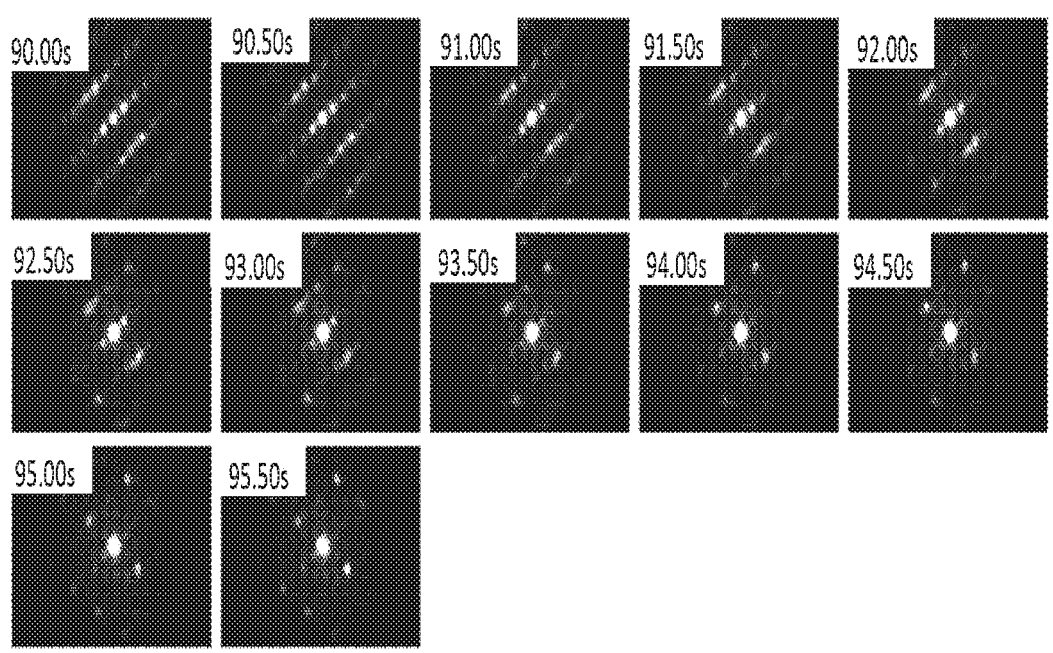
FIG. 20 shows electron diffraction patterns.

FIGS. 14 to 20 show observed diffraction patterns. The number of seconds in FIGS. 14 to 20 represents time elapsed from the start of observation. FIG. 14 shows the diffraction patterns from 0 s to 14.5 s (from the upper left pattern). FIG. 15 shows the diffraction patterns from 15 s to 29.5 s. FIG. 16 shows the diffraction patterns from 30 s to 44.5 s. FIG. 17 shows the diffraction patterns from 45 s to 59.5 s. FIG. 18 shows the diffraction patterns from 60 s to 74.5 s. FIG. 19 shows the diffraction patterns from 75 s to 89.5 s. FIG. 20 shows the diffraction patterns from 90 s to 95.5 s. Because the diffraction patterns start to clearly appear from data at 2.5 s, the observation point A was presumably reached at 2 s to 2.5 s. The diffraction patterns at 2.5 s to 4 s appear to be approximately the same. The diffraction patterns at 4.5 s to 91 s are different from the diffraction patterns at 2.5 s to 4 s because of an increase in the distance from the surface of the particle and are similar to one another. These patterns were found to be attributed to a layered rock-salt crystal structure as described below. Different diffraction patterns were obtained again at 92.5 s and later seconds. The above results suggest that diffraction patterns are different between the outside of the particle and the inside of the particle. Note that the data obtained after 93 s might be influenced by the adjacent particle. Note that the diffraction patterns from 3.5 s to 7 s may appear to be a mixture of diffraction patterns of a spinel crystal structure and a layered rock-salt crystal structure which are described later. This implies the possibility of formation of a mixed region.

Figure 22:
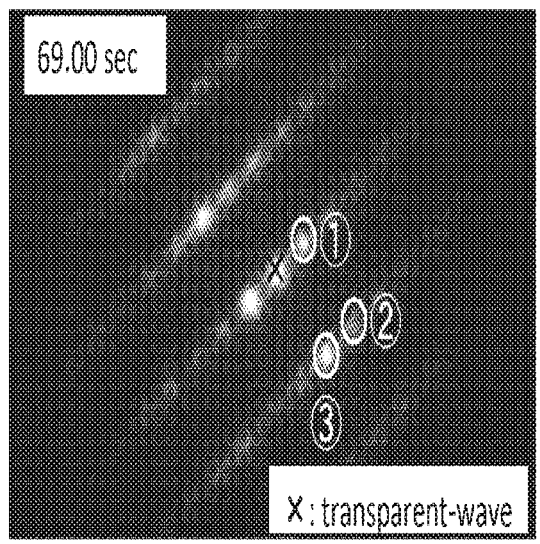
FIG. 22 shows an analysis result of an electron beam diffraction pattern.

FIG. 21 shows a result of identifying the crystal structure indicated by the diffraction pattern at 4 s, and FIG. 22 shows a result of identifying the crystal structure indicated by the diffraction pattern at 69 s. As shown in FIG. 21, the diffraction pattern at 4 s was found to be attributed to $LiMn_2O_4$ with a spinel crystal structure based on the d value obtained from spots (grating space) and the shape of the spot, according to data in JCPDS card. Similarly, as shown in FIG. 22, the electron diffraction pattern at 69 s was found to be attributed to $Li_2MnO_3$ with a layered rock-salt crystal structure.

When it is assumed that the diffraction pattern at 2.5 s is the one of the outermost surface of the particle, substantially the same patterns were observed for approximately 1.5 s. It took 91 s to 94 s to observe the particle over a distance of approximately 375 nm; thus, the movement distance for observation per 1 s can be estimated to be 4 nm. In a region from the outermost surface of the particle to a depth of approximately 6 nm (=4 nm×1.5 s), there is presumably a region with a spinel crystal structure. Here, in the case where the particle of one embodiment of the present invention has the region with a spinel crystal structure, the thickness of the region is preferably greater than or equal to 1 nm, more preferably greater than or equal to 3 nm, still more preferably greater than or equal to 6 nm from the surface of the particle, and there is preferably a region with a layered rock-salt crystal structure inside the particle. Note that there is a possibility that a region including both a spinel crystal structure and a layered rock-salt crystal structure exists between the region with a spinel crystal structure and the region with a layered rock-salt crystal structure.

Figure 23:
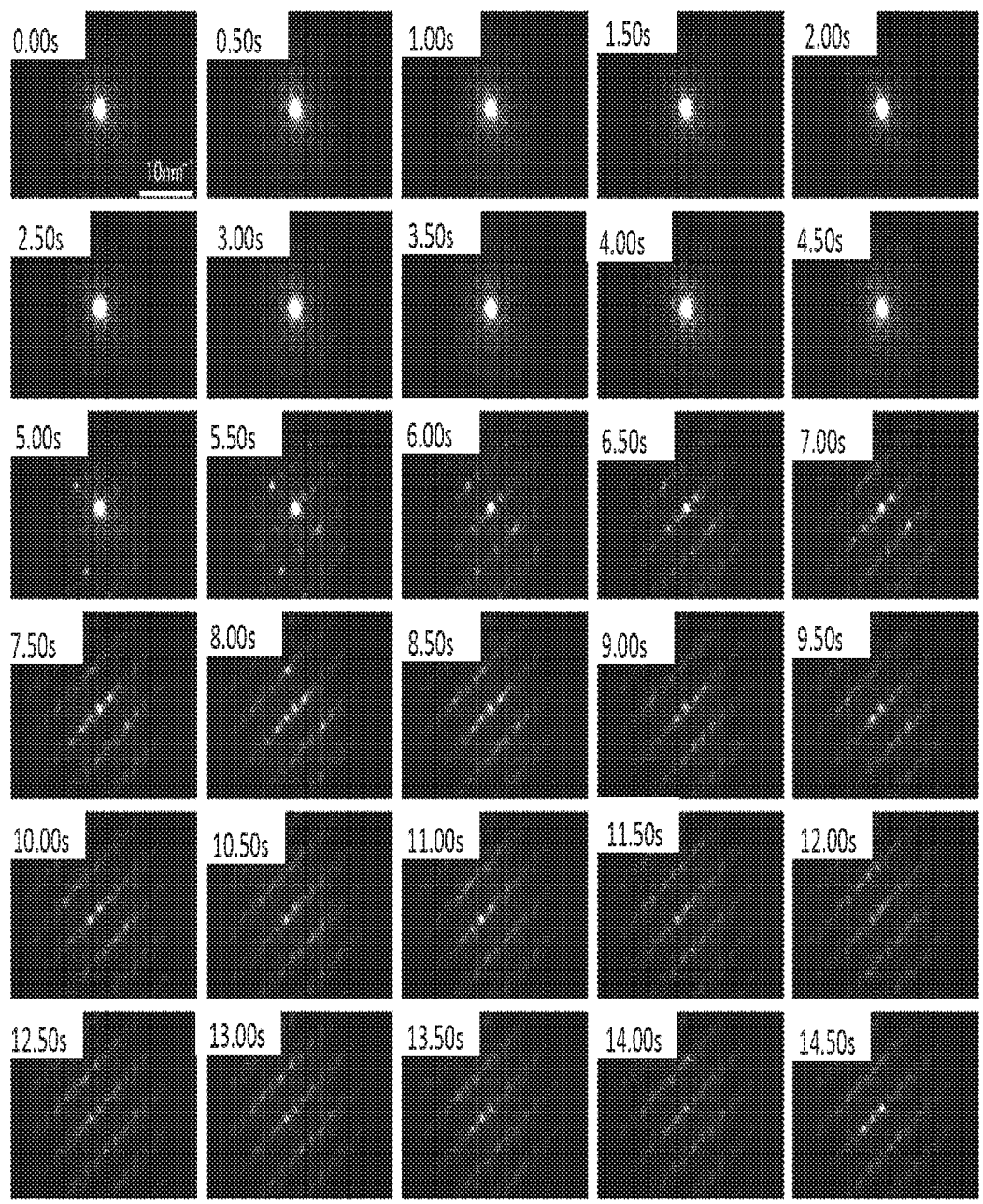
FIG. 23 shows electron diffraction patterns.
Figure 24:
FIG. 24 shows electron diffraction patterns.
Figure 25:
FIG. 25 shows electron diffraction patterns.
Figure 26:
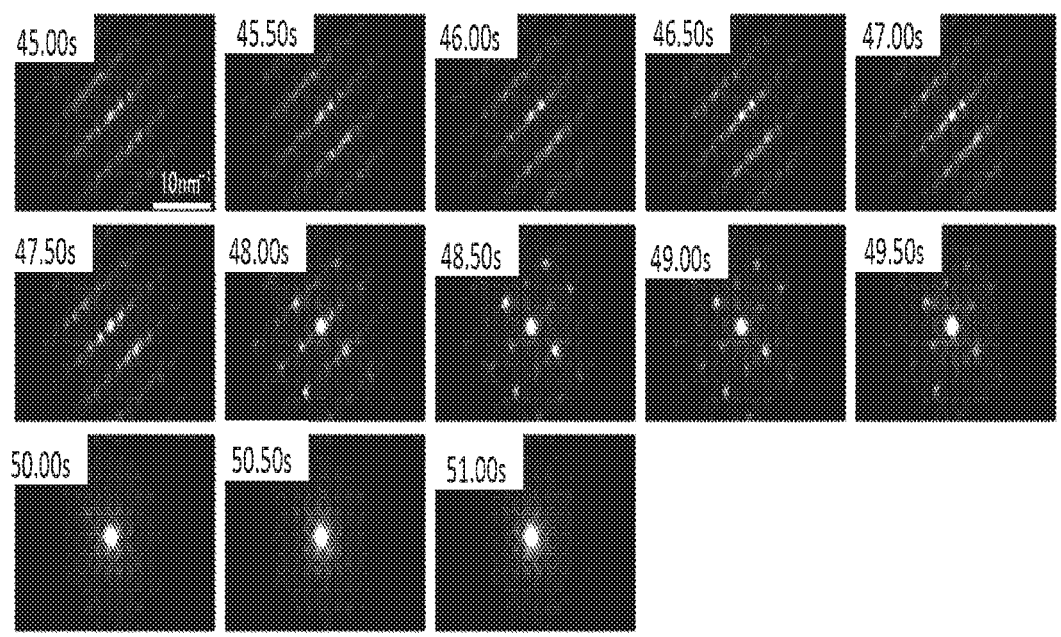
FIG. 26 shows electron diffraction patterns.

Next, scanning was performed along the arrow indicated by a dotted line including an observation point C and an observation point D illustrated in FIG. 13 to observe the diffraction patterns. The observation time was 51 s in total. FIGS. 23 to 26 show diffraction patterns from 0 s to 51 s. FIG. 23 shows the diffraction patterns from 0 s to 14.5 s. FIG. 24 shows the diffraction patterns from 15 s to 29.5 s. FIG. 25 shows the diffraction patterns from 30 s to 44.5 s. FIG. 26 shows the diffraction patterns from 45 s to 51 s. The diffraction patterns were at intervals of 0.5 s. Because the diffraction patterns start to clearly appear from the data at 5 s, the observation point C was presumably reached at 4.5 s to 5 s. The distance between the observation points C and D in FIG. 13 is approximately 250 nm. In addition, the diffraction patterns from 5 s to 50 s are clearly observed; accordingly, the observation point D was presumably reached at 49.5 s to 50 s. These results suggest that it took approximately 45 s to reach the observation point D from the observation point C shown in FIG. 13.

The results shown in FIGS. 23 to 26 show that the diffraction patterns are different between the outside of the particle and the inside of the particle like data in FIGS. 14 to 20. Furthermore, it is suggested that the diffraction patterns of the outside of the particle are similar to the pattern of $LiMn_2O_4$ with a spinel crystal structure in FIG. 21 and the diffraction patterns of the inside of the particle are similar to the pattern of $Li_2MnO_3$ with a layered rock-salt crystal structure in FIG. 22.

Example 2

In this example, HAADF-STEM images of a lithium manganese composite oxide of one embodiment of the present invention will be described.
[Fabrication of Electrode]

An electrode was fabricated using a lithium manganese composite oxide synthesized using the method described in Example 1.

The obtained lithium manganese composite oxide, PVDF as resin, and AB as a conductive additive were dissolved in N-methyl-2-pyrrolidon (NMP), a polar solvent, and were mixed to form slurry. The compounding ratio of the lithium manganese composite oxide to AB and PVDF was adjusted to be 80:15:5 in weight ratio. Then, the slurry was applied to a 20-μm-thick current collector made of aluminum and dried, so that an electrode was fabricated. The obtained electrode is referred to as Electrode A. Note that a surface of the current collector was covered with an undercoat in advance.

Next, the coin-type storage battery described in Embodiment 4 was fabricated. A lithium metal was used for the negative electrode. The electrolytic solution was formed by dissolving $LiPF_6$ as a salt in a mixed solution containing ethylene carbonate and diethyl carbonate, which were aprotic organic solvents, at a volume ratio of 1:1. As the separator, polypropylene (PP) was used.

Then, the fabricated storage battery was not charged and discharged and was disassembled in an inert atmosphere to take out Electrode A.
[Stem Observation]

Next, Electrode A taken out from the storage battery was sliced using a focused FIB. Sliced Electrode A was observed with a scanning transmission electron microscope (STEM). STEM images were obtained using an atomic resolution analytical electron microscope JEM-ARM200F manufactured by JEOL Ltd. The accelerating voltage was 200 kV.

Figure 27A:
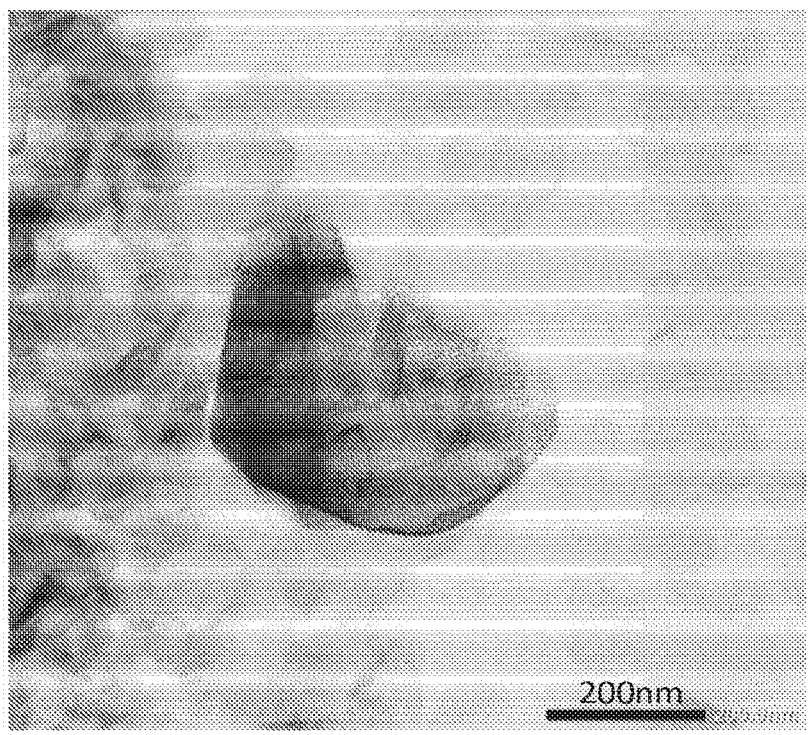
FIGS. 27A and 27B show an observation result obtained with a STEM.
Figure 27B:
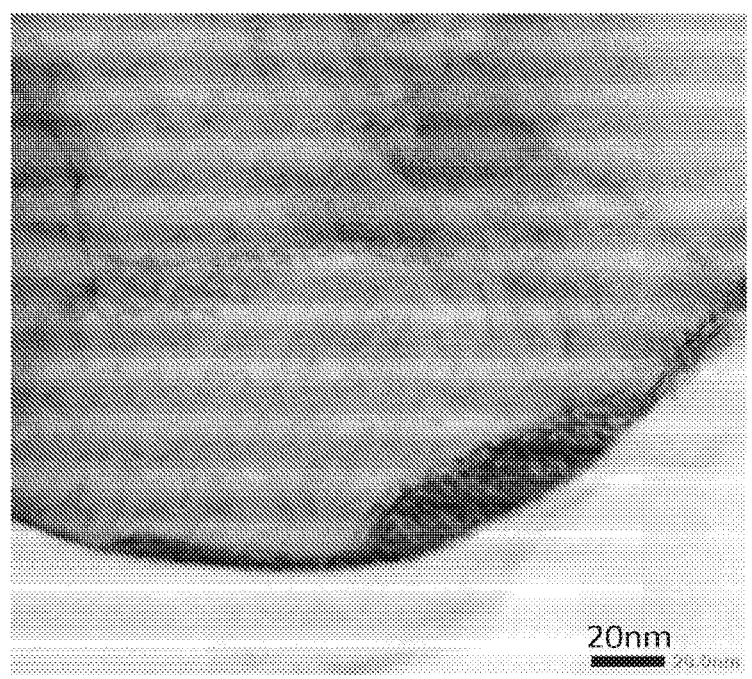
Figure 28A:
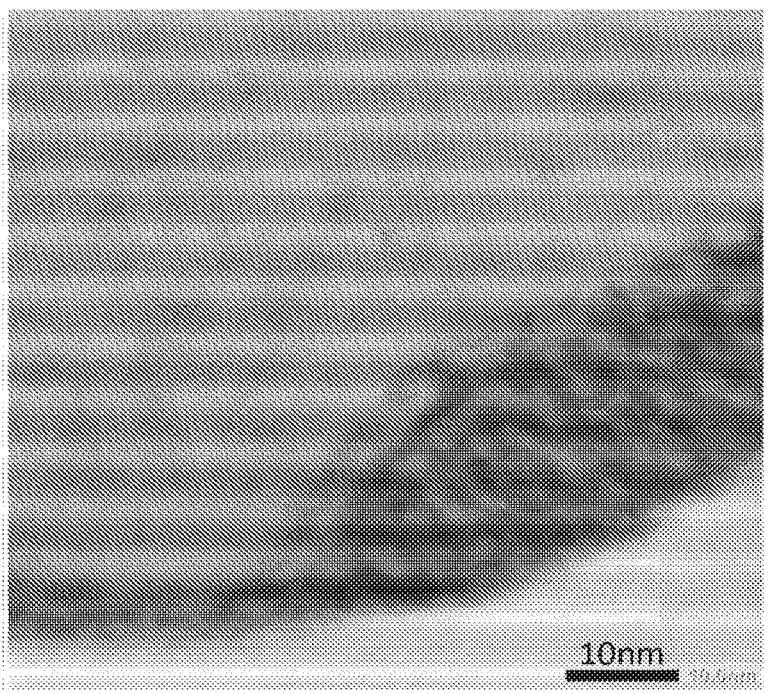
FIGS. 28A and 28B are a bright-field image and a HAADF-STEM image obtained with a STEM.
Figure 28B:
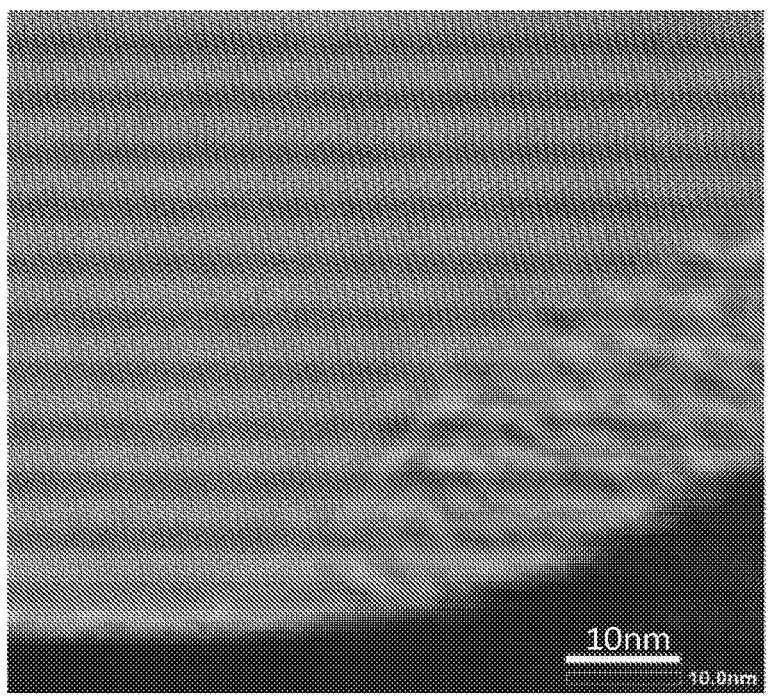

FIGS. 27A and 27B and FIG. 28A are bright-field images obtained with a STEM. FIG. 27A is the image observed at a magnification of 200,000 times, and FIG. 27B is the image observed at a magnification of 1,000,000 times. FIGS. 28A and 28B are a bright-field image and a HAADF-STEM image observed using a STEM at a magnification of 3,000,000 times.

Figure 29A:
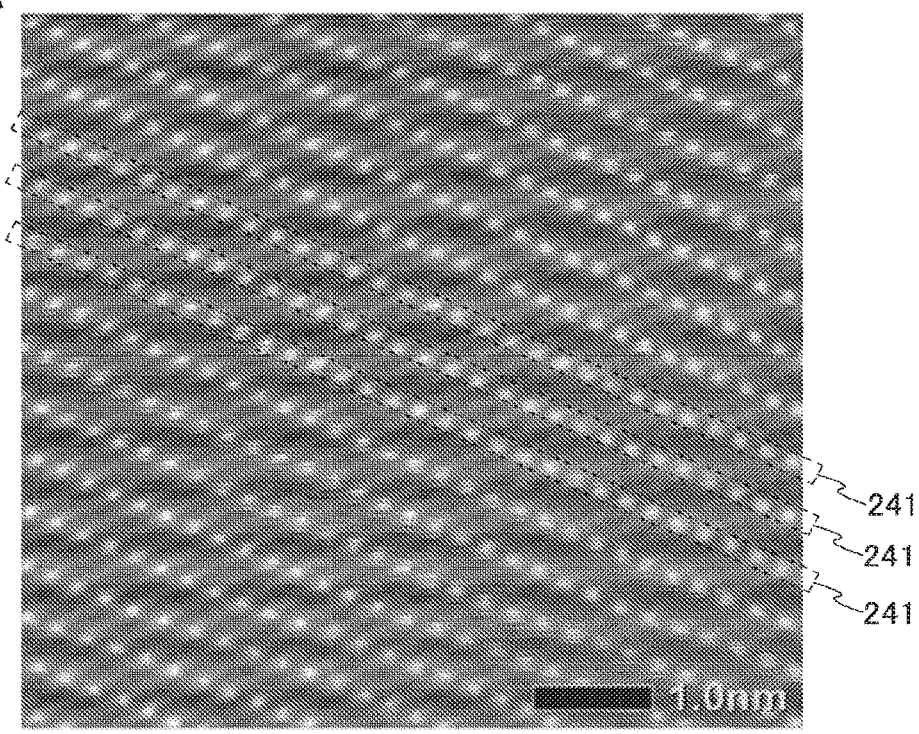
FIGS. 29A and 29B show observation results obtained with a STEM.
Figure 29B:
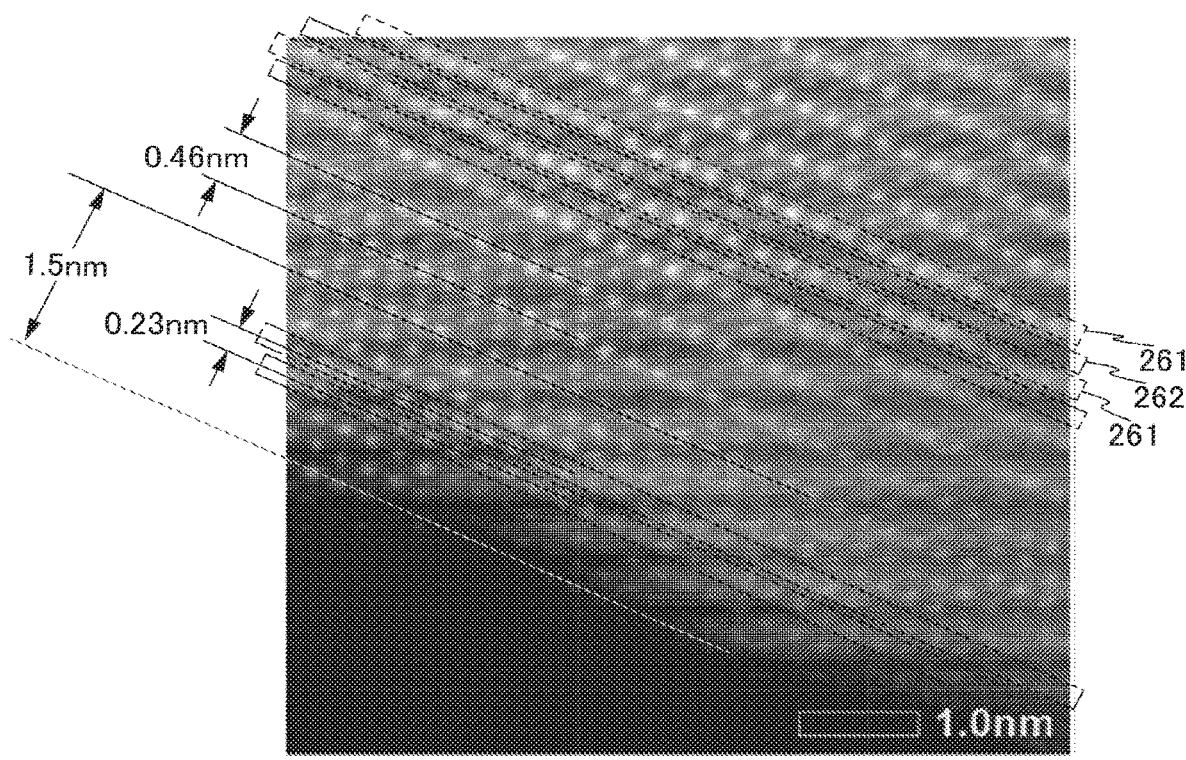

FIGS. 29A and 29B are enlarged images of a part of the image in FIG. 28B that are observed at a magnification of 30,000,000 times. FIG. 29A is an enlarged image of a region that is approximately 47 nm apart from the surface of the particle. FIG. 29B is an enlarged image of the vicinity of the surface of the particle. In the HAADF-STEM image of FIG. 29A, layers 241 indicated by observed bright points are arranged at substantially equal intervals.

Figure 30A:
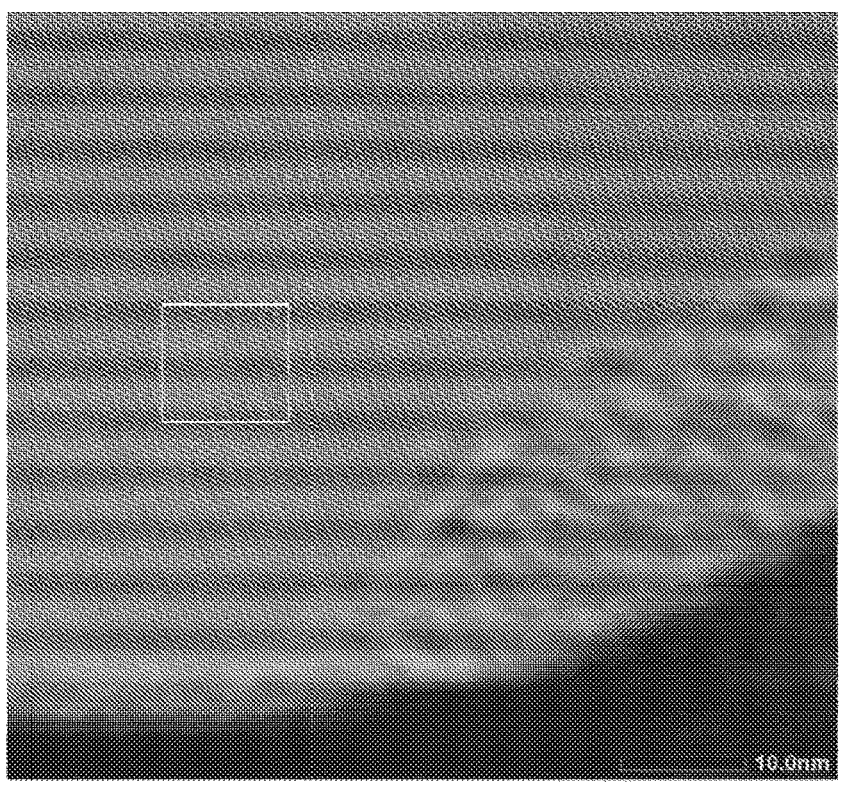
FIG. 30A shows a HAADF-STEM image.
Figure 30B:
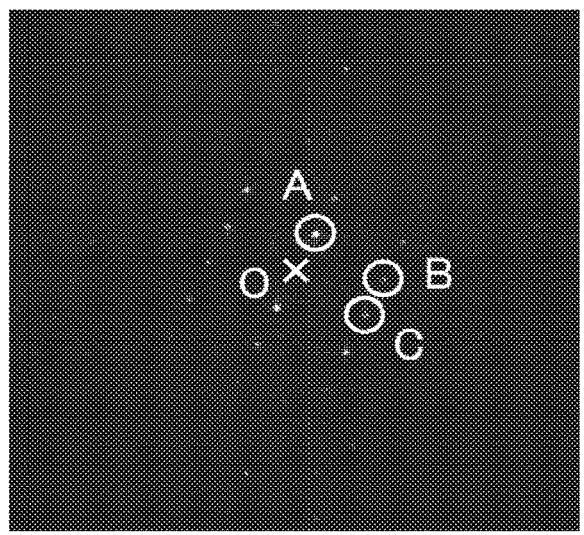
FIG. 30B shows an FFT pattern.

FIG. 30A shows a HAADF-STEM image, and FIG. 30B shows a fast Fourier transformation (FFT) pattern of a region indicated by a quadrangular frame in the HAADF image of FIG. 30A. In addition, the measured values regarding the positional relation (distances and angles) of spots of the obtained FFT pattern and the distances and angles of No. 84-1634 and No. 27-1252 in JCPDS card are shown. Note that the values of No. 84-1634 are those when the incident direction is the [310] direction, and the values of No. 27-1252 are those when the incident direction is the [323] direction. As shown in FIG. 30, the obtained FFT pattern corresponds well to two crystal structures of No. 84-1634 and No. 27-1252 in JCPDS card.

Figure 31A:
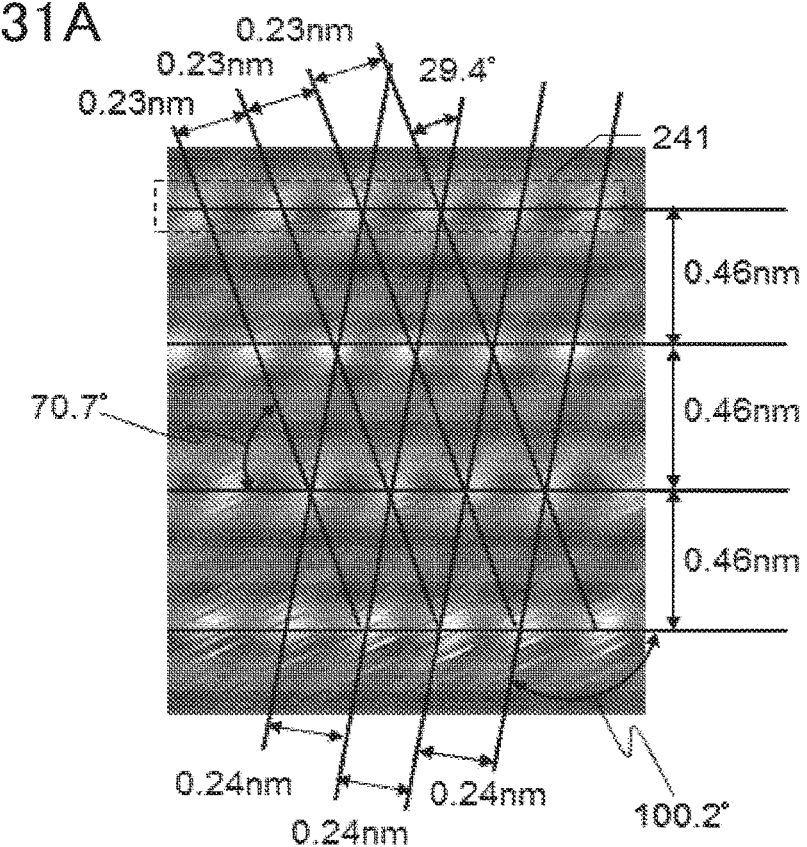
FIG. 31A shows an observation result obtained with a HAADF-STEM.
Figure 31B:
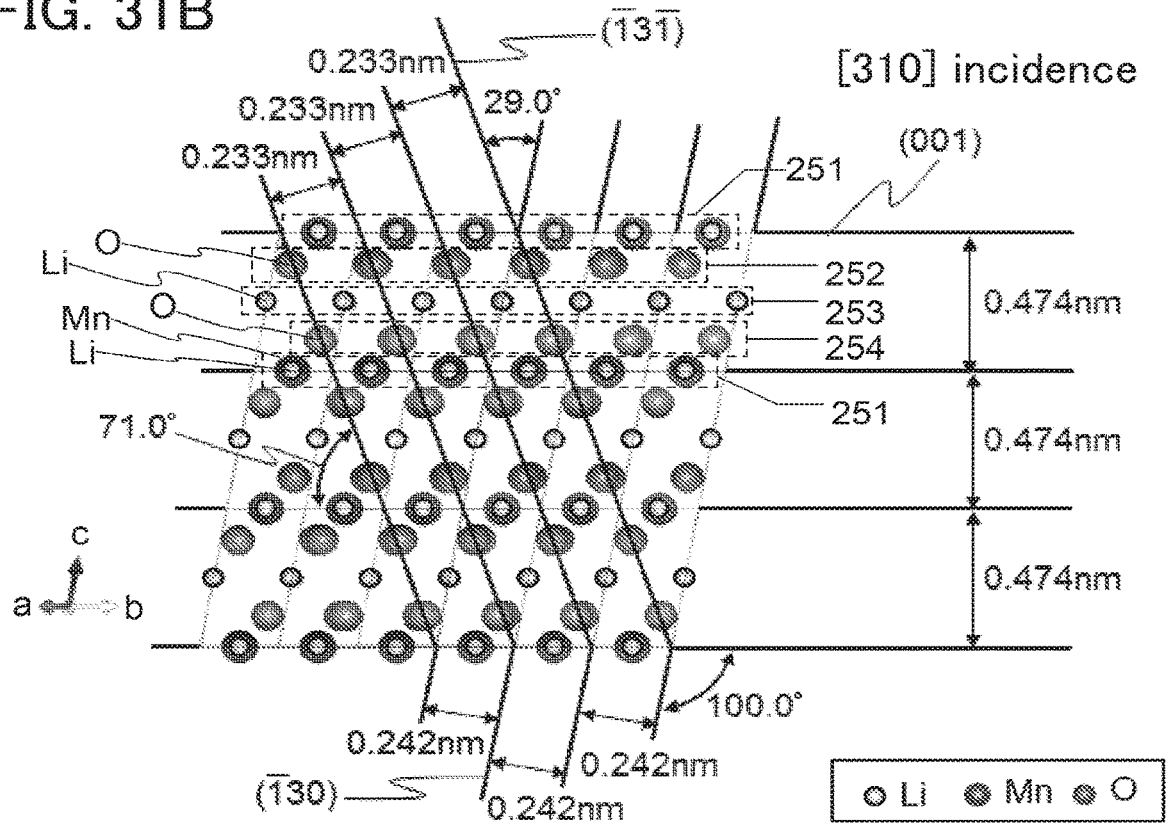
FIG. 31B illustrates a crystal structure.

FIG. 31A is an enlarged image of a part of the HAADF-STEM image in FIG. 29A. FIG. 31B shows the positional relation of atoms observed from the [310] direction based on the crystal structure of $Li_2MnO_3$ of No. 84-1634 in JCPDS card. FIGS. 31A and 31B were compared as follows.

First, in the crystal structure of No. 84-1634, the distance between (−1 3 −1) planes, the distance between (0 0 1) planes, and the distance between (−1 3 0) planes are 0.233 nm, 0.474 nm, and 0.242 nm, respectively, as shown in FIG. 31B, and approximately correspond to interplanar spacings (0.23 nm, 0.46 nm, and 0.24 nm) in the HAADF-STEM image of FIG. 31A that are obtained from the FFT pattern in FIG. 30. In the crystal structure of No. 84-1634, an angle formed by the (−1 3 −1) plane and the (0 0 1) plane, an angle formed by the (0 0 1) plane and the (−1 3 0) plane, and an angle formed by the (−1 3 0) plane and the (−1 3 −1) plane are 29.4°, 100.2°, and 70.7°, respectively, and approximately correspond to angles (29.4°, 100.2°, and 70.7°) in the HAADF-STEM image of FIG. 31A that are obtained from the FFT pattern in FIG. 30.

Here, the lithium manganese composite oxide obtained in Example 1 contains manganese, nickel, and lithium. In contrast, the crystal structure of $Li_2MnO_3$ of No. 84-1634 in JCPDS card, which was used for examination of a crystal structure does not contain nickel. This implies that nickel exists by being substituted for, for example, manganese or lithium in the crystal structure of No. 84-1634.

The layer 241 indicated by bright spots observed at intervals of approximately 0.46 nm in the HAADF-STEM image of FIG. 31A are considered to correspond to a layer 251 in FIG. 31B. The layer 251 contains lithium and manganese. The atomic number of manganese is larger than that of lithium; thus, the bright spots observed in the HAADF-STEM image are assumably attributed to manganese or nickel.

A layer 253 illustrated in FIG. 31B contains lithium and is located between the layers 251. In FIG. 31A, bright spots corresponding to the layer 253 in FIG. 31B are not clearly observed. This is presumably because the atomic number of lithium is small and thus the sensitivity to lithium is low. In addition, corresponding bright spots of a layer 252 and a layer 254 consisting of oxygen that are illustrated in FIG. 31B cannot also be observed clearly in FIG. 31A.

Next, in a region that is greater than or equal to approximately 1.5 nm apart from the surface of the particle in FIG. 29B, layers 261 arranged at intervals approximately equal to those at which the layers 241 observed in FIG. 29A are arranged were observed. In addition, a layer 262 indicated by bright spots was observed between the layers 261 arranged at approximately equal intervals in FIG. 29B. As described above, lithium and oxygen are hardly observed as strong bright spots in the HAADF-STEM image, which implies that the layer 262 contains manganese or nickel. That is to say, there is a possibility that lithium in the layer 253 is partly substituted by manganese or nickel in the crystal structure of No. 84-1634 in FIG. 31B.

In a region that is greater than or equal to approximately 1.5 nm apart from the surface of the particle in FIG. 29B, the layers 261 indicated by strong bright spots and the layers 262 indicated by slightly weak bright spots are alternately arranged, whereas in a region that is less than 1.5 nm apart from the surface of the particle in FIG. 29B, layers indicated by bright spots of similar intensity are arranged. Also considering that spots suggesting a spinel structure were observed in the vicinity of the surface of the particle in the nanobeam electron diffraction pattern described in Example 1, the crystal structure in the region that is less than 1.5 nm apart from the surface of the particle is presumably different from that in the region that is greater than or equal to approximately 1.5 nm apart from the surface of the particle.

Although the above analysis is carried out to determine whether the crystal structure corresponds to the crystal structure of No. 84-1634, a layer corresponding to the layer 253 consisting of lithium and a layer corresponding to the layer 251 consisting of manganese and lithium are included in the crystal structure of No. 27-1252 at positions substantially similar to those of the layers in the crystal structure of No. 84-1634. Thus, it is suggested that the crystal structure of No. 27-1252 corresponds to the crystal structures in the HAADF-STEM images shown in FIGS. 29A and 29B and FIG. 31A.

This application is based on Japanese Patent Application serial no. 2013-209444 filed with Japan Patent Office on Oct. 4, 2013 and Japanese Patent Application serial no. 2013-270950 filed with Japan Patent Office on Dec. 27, 2013, the entire contents of which are hereby incorporated by reference.

What is claimed is:

1. A lithium manganese composite oxide comprising:
    a particle comprising a first region including a crystal with a layered rock-salt structure and a second region including a crystal different from the layered rock-salt structure,
    wherein the second region is in contact with the first region,
    wherein the second region covers 10% or more of an entire outside surface of the first region,
    wherein the layered rock-salt structure is represented by $Li_rMn_{s-t}M_tO_3$,
    wherein $1.4 \leq r \leq 2$, $0.7 \leq s < 1.5$, $0 \leq t < 1.5$, and $s \geq t$ are satisfied,
    wherein an element M is silicon, phosphorus, or a metal element other than lithium and manganese, and
    wherein in the first region Li is partially substituted by Mn or M.

2. A lithium manganese composite oxide comprising:
    a crystal region different from a layered rock-salt structure on at least part of a surface of a particle including a crystal region with the layered rock-salt structure,
    wherein the crystal region different from the layered rock-salt structure covers 10% or more of an entire surface of the particle,
    wherein the layered rock-salt structure is represented by $Li_rMn_{s-t}M_tO_3$,
    wherein $1.4 \leq r \leq 2$, $0.7 \leq s < 1.5$, $0 \leq t < 1.5$, and $s \geq t$ are satisfied,
    wherein an element M is silicon, phosphorus, or a metal element other than lithium and manganese, and
    wherein in the crystal region with a layered rock-salt structure Li is partially substituted by Mn or M.

3. A lithium manganese composite oxide comprising:
    a particle comprising a first region including a crystal with a layered rock-salt structure and a second region including a crystal different from the layered rock-salt structure,
    wherein 10% or more of an entire outer surface of the particle is formed with a layered region having crystal different from the layered rock-salt structure,
    wherein the layered rock-salt structure is represented by $Li_rMn_{s-t}M_tO_3$,
    wherein $1.4 \leq r \leq 2$, $0.7 \leq s < 1.5$, $0 \leq t < 1.5$, and $s \geq t$ are satisfied, and
    wherein an element M is silicon, phosphorus, or a metal element other than lithium and manganese, and
    wherein in the first region Li is partially substituted by Mn or M.

4. The lithium manganese composite oxide according to claim 1, wherein the second region covers 30% or more of the entire outside surface of the first region.

5. A lithium-ion secondary battery comprising the lithium manganese composite oxide according to claim 1 as a positive electrode active material.

6. An electrical device comprising the lithium-ion secondary battery according to claim 5.

7. The lithium manganese composite oxide according to claim 2, wherein the crystal region different from the layered rock-salt structure covers 30% or more of the entire surface of the particle.

8. A lithium-ion secondary battery comprising the lithium manganese composite oxide according to claim 2 as a positive electrode active material.

9. An electrical device comprising the lithium-ion secondary battery according to claim 8.

10. A lithium-ion secondary battery comprising the lithium manganese composite oxide according to claim 3 as a positive electrode active material.

11. An electrical device comprising the lithium-ion secondary battery according to claim 10.

12. The lithium manganese composite oxide according to claim 3, wherein a thickness of the layered region is greater than or equal to 1 nm.

* * * * *